US012155758B2

(12) United States Patent
Muneta et al.

(10) Patent No.: US 12,155,758 B2
(45) Date of Patent: Nov. 26, 2024

(54) SAFETY SYSTEM AND MAINTENANCE METHOD

(71) Applicant: OMRON Corporation, Kyoto (JP)

(72) Inventors: Yasuo Muneta, Kusatsu (JP); Yuta Nagata, Kusatsu (JP)

(73) Assignee: OMRON Corporation, Kyoto (JP)

( * ) Notice: Subject to any disclaimer, the term of this patent is extended or adjusted under 35 U.S.C. 154(b) by 174 days.

(21) Appl. No.: 17/415,743

(22) PCT Filed: Dec. 20, 2019

(86) PCT No.: PCT/JP2019/050128
§ 371 (c)(1),
(2) Date: Jun. 18, 2021

(87) PCT Pub. No.: WO2020/158247
PCT Pub. Date: Aug. 6, 2020

(65) Prior Publication Data
US 2022/0085982 A1    Mar. 17, 2022

(30) Foreign Application Priority Data

Jan. 28, 2019 (JP) ................................ 2019-012603
Jun. 20, 2019 (JP) ................................ 2019-114342

(51) Int. Cl.
*H04L 9/00* (2022.01)
*H04L 9/08* (2006.01)
(Continued)

(52) U.S. Cl.
CPC ............... *H04L 9/088* (2013.01); *H04L 9/30* (2013.01); *H04L 9/3236* (2013.01)

(58) Field of Classification Search
CPC ......... H04L 9/088; H04L 9/30; H04L 9/3236; H04L 9/0643; H04L 9/0822;
(Continued)

(56) References Cited

U.S. PATENT DOCUMENTS

2008/0189693 A1\* 8/2008 Pathak ..................... G06F 8/65
709/223
2012/0185685 A1   7/2012 Volmat et al.
(Continued)

FOREIGN PATENT DOCUMENTS

CA    3002280    11/2018
CN    1977256    6/2007
(Continued)

OTHER PUBLICATIONS

"Search Report of Europe Counterpart Application", issued on Sep. 14, 2022, pp. 1-8.
(Continued)

*Primary Examiner* — Kevin Ayala
(74) *Attorney, Agent, or Firm* — JCIPRNET

(57) ABSTRACT

A safe system is able to execute remote maintenance reliably with respect to a process execution unit for executing a safety control in accordance with a safety program. This safety system includes: a process execution unit for executing a safety control in accordance with a safety program; a communication unit that is directly connected to the process execution unit and mediates external access to a safety program held in the process execution unit; and a support device that is connected via a network to the communication unit and, in accordance with a user operation, executes maintenance, including an addition or a change, with respect to the safety program. The support device and the communication unit identify each other by means of information that has been exchanged in advance, and exchange data required for maintenance.

8 Claims, 25 Drawing Sheets

(51) Int. Cl.
*H04L 9/30* (2006.01)
*H04L 9/32* (2006.01)

(58) Field of Classification Search
CPC ......... H04L 9/3263; G06F 21/44; G06F 8/65;
G06F 21/57; G06F 21/572
See application file for complete search history.

(56) References Cited

U.S. PATENT DOCUMENTS

| | | |
|---|---|---|
| 2013/0346759 A1 | 12/2013 | LaMacchia et al. |
| 2015/0180840 A1 | 6/2015 | Jung et al. |
| 2017/0003956 A1* | 1/2017 | Chang ..................... G06F 8/658 |
| 2018/0343562 A1 | 11/2018 | Nalukurthy et al. |
| 2020/0050767 A1* | 2/2020 | Lin ......................... G06F 21/64 |
| 2020/0151335 A1* | 5/2020 | Ayoub .................. G06F 21/572 |

FOREIGN PATENT DOCUMENTS

| | | |
|---|---|---|
| CN | 102047266 | 5/2011 |
| CN | 103140856 | 6/2013 |
| CN | 109214168 | 1/2019 |
| EP | 2479701 | 7/2012 |
| JP | 2007518145 | 7/2007 |
| JP | 2009124520 | 6/2009 |
| JP | 2010055652 | 3/2010 |
| JP | 2015039141 | 2/2015 |
| JP | 2016072675 | 5/2016 |
| JP | 2017163612 | 9/2017 |
| JP | 2017200031 | 11/2017 |
| JP | 2018041224 | 3/2018 |
| WO | 2007060959 | 5/2007 |

OTHER PUBLICATIONS

"Office Action of Japan Counterpart Application" with English translation thereof, issued on Jun. 13, 2023, p. 1-p. 6.

"Office Action of China Counterpart Application", issued on Sep. 20, 2023, with English translation thereof, p. 1- p. 21.

"International Search Report (Form PCT/ISA/210) of PCT/JP2019/050128," mailed on Jan. 28, 2020, with English translation thereof, pp. 1-5.

"Written Opinion of the International Searching Authority (Form PCT/ISA/237) of PCT/ JP2019/050128," mailed on Jan. 28, 2020, with English translation thereof, pp. 1-9.

* cited by examiner

SAFETY SYSTEM AND MAINTENANCE METHOD

CROSS-REFERENCE TO RELATED APPLICATION

This application is a 371 application of the International PCT application serial no. PCT/JP2019/050128, filed on Dec. 20, 2019, which claims the priority benefits of Japan Patent Application No. 2019-012603, filed on Jan. 28, 2019 and Japan Patent Application No. 2019-114342, filed on Jun. 20, 2019. The entirety of each of the above-mentioned patent applications is hereby incorporated by reference herein and made a part of this specification.

TECHNICAL FIELD

The present invention relates to a remote maintenance function for a safety system.

BACKGROUND ART

It is necessary to realize functional safety according to international standards such as IEC 61508 in order to safely use facilities or machines used in various manufacturing sites.

Such functional safety may be realized by a safety controller executing a safety program. For example, Japanese Patent Laid-Open No. 2010-055652 (Patent Literature 1) discloses a program development support device for a safety controller.

CITATION LIST

Patent Literature

[Patent Literature 1]
Japanese Patent Laid-Open No. 2010-055652

SUMMARY OF INVENTION

Technical Problem

Typically, an environment for performing various types of maintenance is provided for a controller or the like executing safety control according to a safety program. An environment for performing maintenance related to such safety control is required to be formed according to international standards such as IEC 62061.

As a result, maintenance related to safety control is required to be performed at a site where a controller is disposed, and this is a constraint in improving maintenance efficiency or productivity.

An objective of the present invention is to provide a configuration capable of reliably executing remote maintenance on a process execution unit that executes safety control according to a safety program.

Solution to Problem

According to an aspect of the present invention, there is provided a safety system including a process execution unit that executes safety control according to a safety program; a communication unit that is directly connected to the process execution unit and mediates external access to the safety program stored in the process execution unit; and a support device that is connected to the communication unit via a network and executes maintenance including an addition or a change with respect to the safety program in accordance with a user operation. The support device and the communication unit identify each other by using information exchanged in advance, and exchange data required for the maintenance.

The communication unit may store a key as at least part of the information exchanged in advance. The support device may encrypt the data required for the maintenance such that the data is decryptable with the key by the communication unit, and transmit the data to the communication unit.

The communication unit may store a first secret key as the key. The support device may store at least one of a first public key forming a pair with the first secret key and a first electronic certificate issued for the first public key.

In a case where the data transmitted from the support device is decryptable with the first secret key, the communication unit may transmit the decrypted data to the process execution unit.

The communication unit may define an expiration date for the first public key in advance in response to a request from outside, and then provide the first public key to the support device.

The support device may store the first electronic certificate issued for the first public key forming a pair with the first secret key, and the first electronic certificate may include identification information for identifying the process execution unit. The support device may determine whether or not identification information of the process execution unit acquired via the communication unit matches the identification information included in the first electronic certificate before the data required for the maintenance is transmitted.

The support device may transmit the data required for the maintenance to the communication unit on condition that the identification information of the process execution unit acquired via the communication unit matches the identification information included in the first electronic certificate.

The support device may generate a third key that is a one-time key in a case where the data required for the maintenance is required to be transmitted, and encrypt the data required for the maintenance with the third key, encrypt the third key to be decryptable with the key by the communication unit, and transmit the data and the third key to the communication unit.

The support device may be configured to transmit the safety program as the data required for the maintenance. The support device may store a second secret key. The communication unit may store at least one of a second public key forming a pair with the second secret key and a second electronic certificate issued for the second public key. The support device may encrypt a first hash value calculated from the safety program with the second secret key, and transmit the encrypted first hash value to the communication unit. The communication unit may determine whether or not a second hash value calculated from the safety program that has been received from the support device matches a result obtained by decrypting the encrypted first hash value received from the support device with the second public key.

The communication unit may encrypt the second hash value calculated from the safety program that has been received from the support device, and transmit the second hash value to the support device. The support device may determine whether or not a result obtained by decrypting the encrypted second hash value received from the communication unit matches the first hash value calculated from the safety program.

The process execution unit and the communication unit may be provided separately from each other.

According to another aspect of the present invention, there is provided a maintenance method in a controller system including a process execution unit that executes safety control according to a safety program. The maintenance method includes a step of connecting a support device to a communication unit via a network; a step of causing the support device to execute maintenance including an addition or a change with respect to the safety program in accordance with a user operation; and a step of causing the support device and the communication unit to identify each other by using information exchanged in advance, and to exchange data required for the maintenance.

Advantageous Effects of Invention

It is possible to provide a configuration capable of reliably executing remote maintenance on a process execution unit that executes safety control according to a safety program.

DESCRIPTION OF EMBODIMENTS

Figure 1:
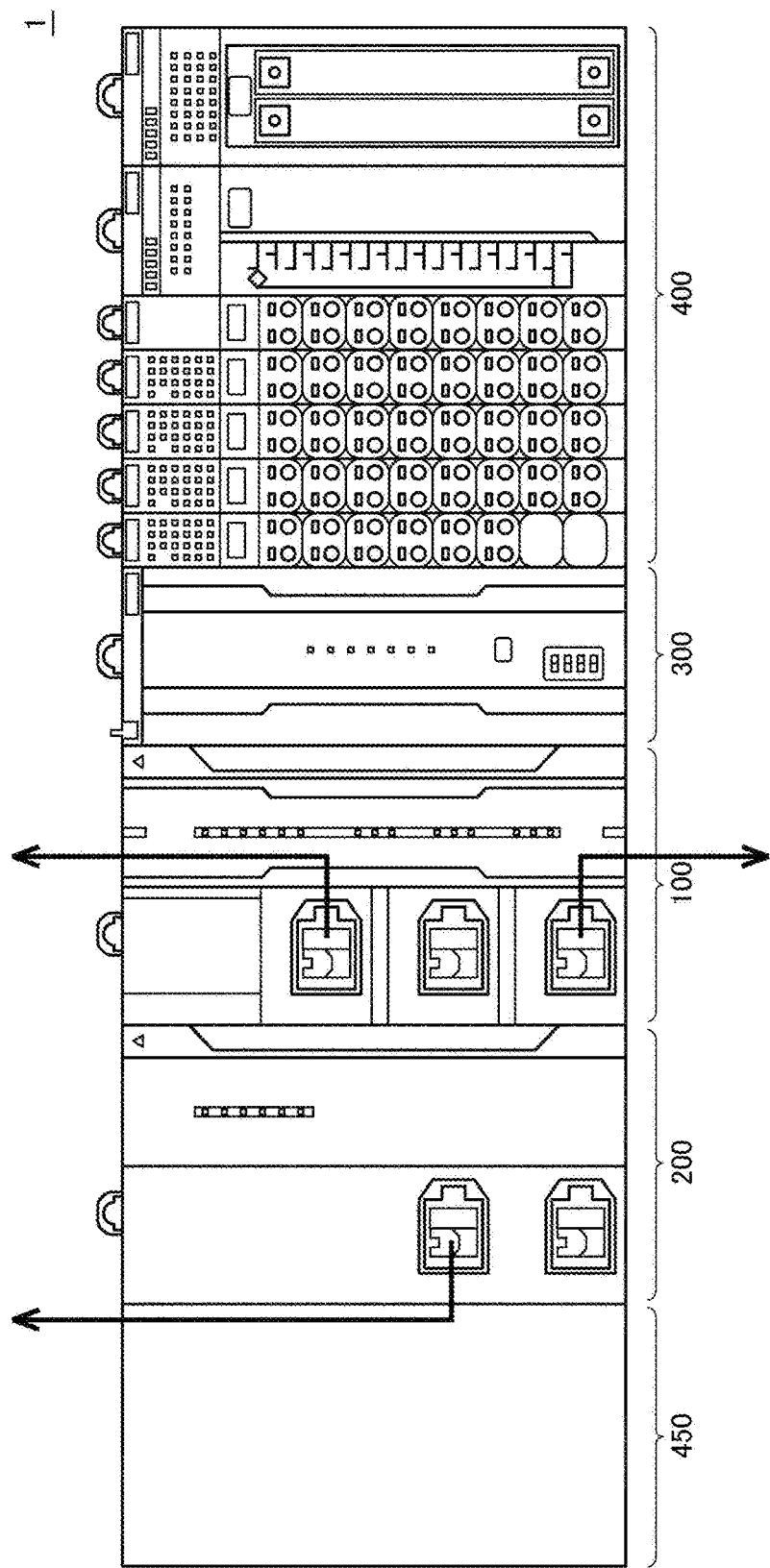
FIG. 1 is an exterior diagram illustrating a configuration example of a safety system according to the present embodiment.

An embodiment of the present invention will be described in detail with reference to the drawings. The same or similar portions in the drawings will be given the same reference numerals, and description thereof will not be repeated.

<A. Application Example>

First, the overall configuration of a safety system 1 according to the present embodiment will be described.

FIG. 1 is an exterior diagram illustrating a configuration example of the safety system 1 according to the present embodiment. With reference to FIG. 1, the safety system 1 includes a control unit 100, a relay unit 200, a safety unit 300, one or more functional units 400, and a power unit 450.

The control unit 100 and the relay unit 200 are connected to each other via any data transmission path (for example, PCI Express or Ethernet (registered trademark)). The control unit 100 is connected to the safety unit 300 and one or a plurality of functional units 400 via an internal bus 10 (refer to FIG. 2).

The control unit 100 executes principal processes in the safety system 1. The control unit 100 executes control calculation for controlling a control target according to request specifications that have been freely designed. The control calculation executed by the control unit 100 will also be referred to as "standard control" in contrast to control calculation executed by the safety unit 300 that will be described later. In the configuration example illustrated in FIG. 1, the control unit 100 has one or a plurality of communication ports. The control unit 100 corresponds to a process execution unit that executes the standard control according to a standard control program.

The relay unit 200 is connected to the control unit 100 and has a communication function with respect to other devices. In the configuration example illustrated in FIG. 1, the relay unit 200 has one or a plurality of communication ports. Details of the communication function provided by the relay unit 200 will be described later.

The safety unit 300 executes control calculation for realizing a safety function related to a control target separately from the control unit 100. The control calculation executed by the safety unit 300 will also be referred to as "safety control". Typically, "safety control" is designed to satisfy requirements for realizing the safety function defined in IEC 61508 or the like. "Safety control" is a general term for processes for preventing human safety from being threatened by facilities, machines, or the like. The safety unit 300 corresponds to a process execution unit that executes the safety control according to a safety program SPG.

The functional unit 400 provides various functions for realizing control for various control targets in the safety system 1. The functional unit 400 may typically include an I/O unit, a safety I/O unit, a communication unit, a motion controller unit, a temperature adjustment unit, a pulse counter unit, and the like. The I/O unit may include, for example, a digital input (DI) unit, a digital output (DO) unit, an analog input (AI) unit, an analog output (AO) unit, a pulse catch unit, and a complex unit in which a plurality of types of units are combined with each other. The safety I/O unit performs I/O processes related to the safety control.

The power unit 450 supplies power with a predetermined voltage to each unit configuring the safety system 1.

In the safety system 1 according to the present embodiment, remote maintenance on the safety unit 300 that executes the safety control is possible.

Figure 2:
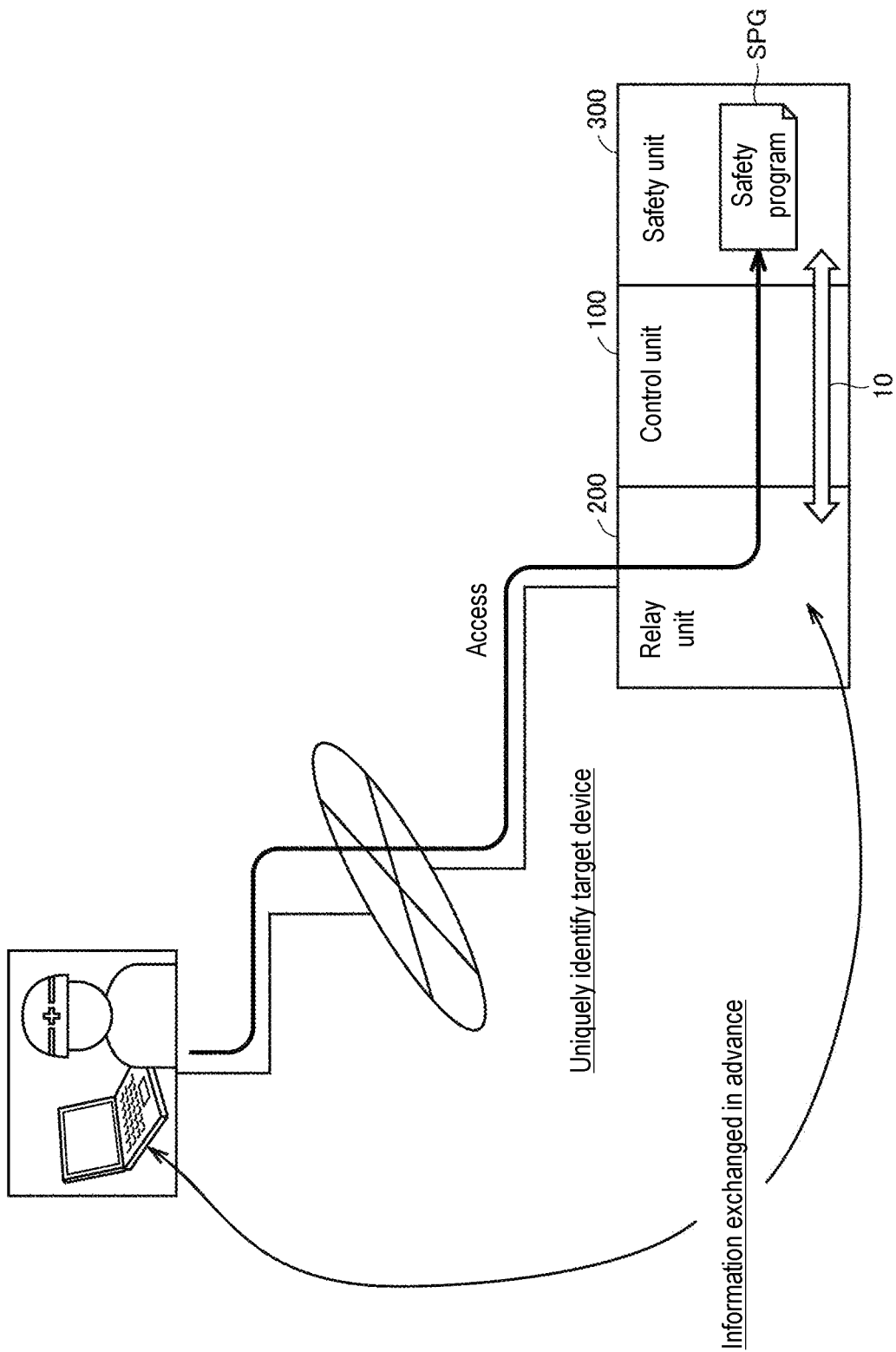
FIG. 2 is a schematic diagram for describing an outline of remote maintenance in the safety system according to the present embodiment.

FIG. 2 is a schematic diagram for describing an outline of remote maintenance in the safety system 1 according to the present embodiment. With reference to FIG. 2, the safety system 1 is connected to a network via the relay unit 200. The support device 500 is also accessible to the network.

The relay unit 200 corresponds to a communication unit that is directly connected to the safety unit 300 corresponding to a process execution unit and mediates external access to the safety program SPG stored in the safety unit 300.

In the present specification, the phrase "directly connected" indicates that there is no element that may cause misrecognition of a connection destination between connected units. In other words, the phrase indicates a state in which each unit can uniquely identify the other unit. In the safety system 1 according to the present embodiment, the internal bus 10 is exemplified as a "directly connected" constituent. However, the internal bus 10 is only an example, and connection may be performed by using any medium or method.

The support device 500 is connected to the relay unit 200 corresponding to a communication unit via the network, and executes maintenance including an addition or a change with respect to the safety program SPG in accordance with a user operation. More specifically, an application executed by the support device 500 can perform a process of creating or editing the safety program SPG executed by the safety unit 300.

In the present specification, "maintenance" is a concept including a state of the safety unit 300 that performs the safety control or an operation of monitoring or changing the safety program SPG executed by the safety unit 300. The "maintenance" is fundamentally executed by an operator (user) operating the support device 500. In the present specification, the term "remote maintenance" indicates that maintenance is executed in a state in which an operator operating the support device 500 is present in a place where the operator cannot directly check (view) the safety system 1 (safety unit 300) that is a maintenance target.

In the present embodiment, the safety system 1 that is a maintenance target can be uniquely identified. In other words, the support device 500 and the relay unit 200 of the safety system 1 identify each other by using information exchanged in advance, and exchange data required for maintenance.

In the present specification, the phrase "exchanged in advance" indicates a state in which part of information stored in one device or separate information that is derived from the information is directly or indirectly given to the other device. "Information exchanged in advance" is a general term for information stored in both devices in this state. "Information exchanged in advance" is used to uniquely identify a certain relay unit 200 from the support device 500. That is, "information exchanged in advance" is used to prevent situations in which data is exchanged with a connection destination different from an original connection destination due to, for example, setting mistakes, spoofing, and camouflage.

In the following description, a configuration of using an electronic "key" (typically, a secret key/a public key conforming to a public key basis, or a common key) as a typical example of the "information exchanged in advance" will be described, but is not limited thereto, and any type of information may be used as long as the information can uniquely identify connection destinations.

"Information exchanged in advance" is used, and thus it is possible to realize a function capable of uniquely identifying connection destinations and thus to provide secure remote maintenance while satisfying requirements required for the safety controller executing the safety program SPG <B. Hardware Configuration Example of Each Unit>

Next, a hardware configuration example of each unit configuring the safety system 1 according to the present embodiment will be described.

(b1: Control Unit 100)

Figure 3:
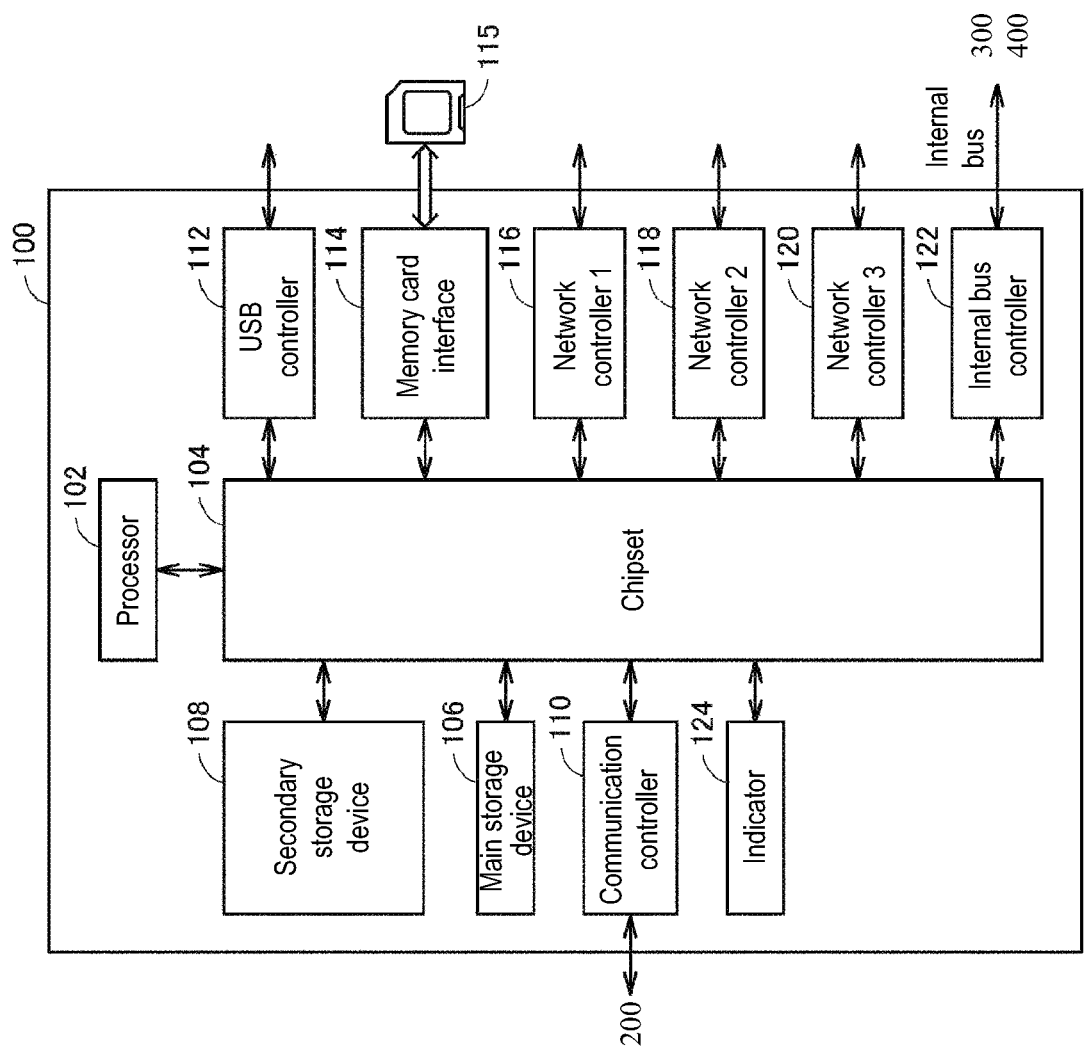
FIG. 3 is a schematic diagram illustrating a hardware configuration example of a control unit configuring the safety system according to the present embodiment.

FIG. 3 is a schematic diagram illustrating a hardware configuration example of the control unit 100 configuring the safety system 1 according to the present embodiment. With reference to FIG. 3, the control unit 100 includes, as principal components, a processor 102 such as a central processing unit (CPU) or a graphics processing unit (GPU), a chipset 104, a main storage device 106, a secondary storage device 108, a communication controller 110, a Universal Serial Bus (USB) controller 112, a memory card interface 114, network controllers 116, 118, and 120, an internal bus controller 122, and an indicator 124.

The processor 102 reads various programs stored in the secondary storage device 108, loads the programs into the main storage device 106, and executes the programs to realize control calculation related to the standard control and various processes described later. The chipset 104 mediates exchange of data between the processor 102 and each component to realize the overall process in the control unit 100.

The main storage device 106 is configured with a volatile storage device such as a dynamic random access memory (DRAM) or a static random access memory (SRAM). The secondary storage device 108 is configured with a nonvolatile storage device such as a hard disk drive (HDD) or a solid state drive (SSD).

The secondary storage device 108 stores not only a system program but also a control program that operates in an execution environment provided by the system program.

The communication controller 110 performs exchange of data with the relay unit 200. As the communication controller 110, for example, a communication chip supporting PCI Express or Ethernet may be employed.

The USB controller 112 performs exchange of data with any information processing device via USB connection.

The memory card interface 114 is configured to be detachably attached with a memory card 115, and can record the control program or data such as various settings on the memory card 115 or read the control program or the data such as various settings from the memory card 115.

Each of the network controllers 116, 118, and 120 performs exchange of data with any device via a network. The network controllers 116, 118, and 120 may employ an industrial network protocol such as EtherCAT (registered trademark), EtherNet/IP (registered trademark), DeviceNet (registered trademark), or CompoNet (registered trademark).

The internal bus controller 122 performs exchange of data with the safety unit 300 or one or a plurality of functional units 400 configuring the safety system 1. The internal bus 10 (refer to FIG. 2) may employ a communication protocol specific to a manufacturer, or may employ a communication protocol that is the same as or based on any industrial network protocol.

The indicator 124 provides notifications of an operation state and the like of the control unit 100, and is configured with one or a plurality of LEDs or the like disposed on a unit surface.

FIG. 3 illustrates a configuration example in which the necessary functions are provided by the processor 102 executing the programs, but some or all of the provided functions may be installed by using a dedicated hardware circuit (for example, an application specific integrated circuit (ASIC) or a field programmable gate array (FPGA)). Alternatively, main parts of the control unit 100 may be realized by using hardware (for example, an industrial PC based on a general-purpose PC) conforming to a general-purpose architecture. In this case, a virtualization technique may be used to execute a plurality of operating systems (OSs) having different uses in parallel and also to execute necessary applications on each OS.

(b2: Relay Unit 200)

Figure 4:
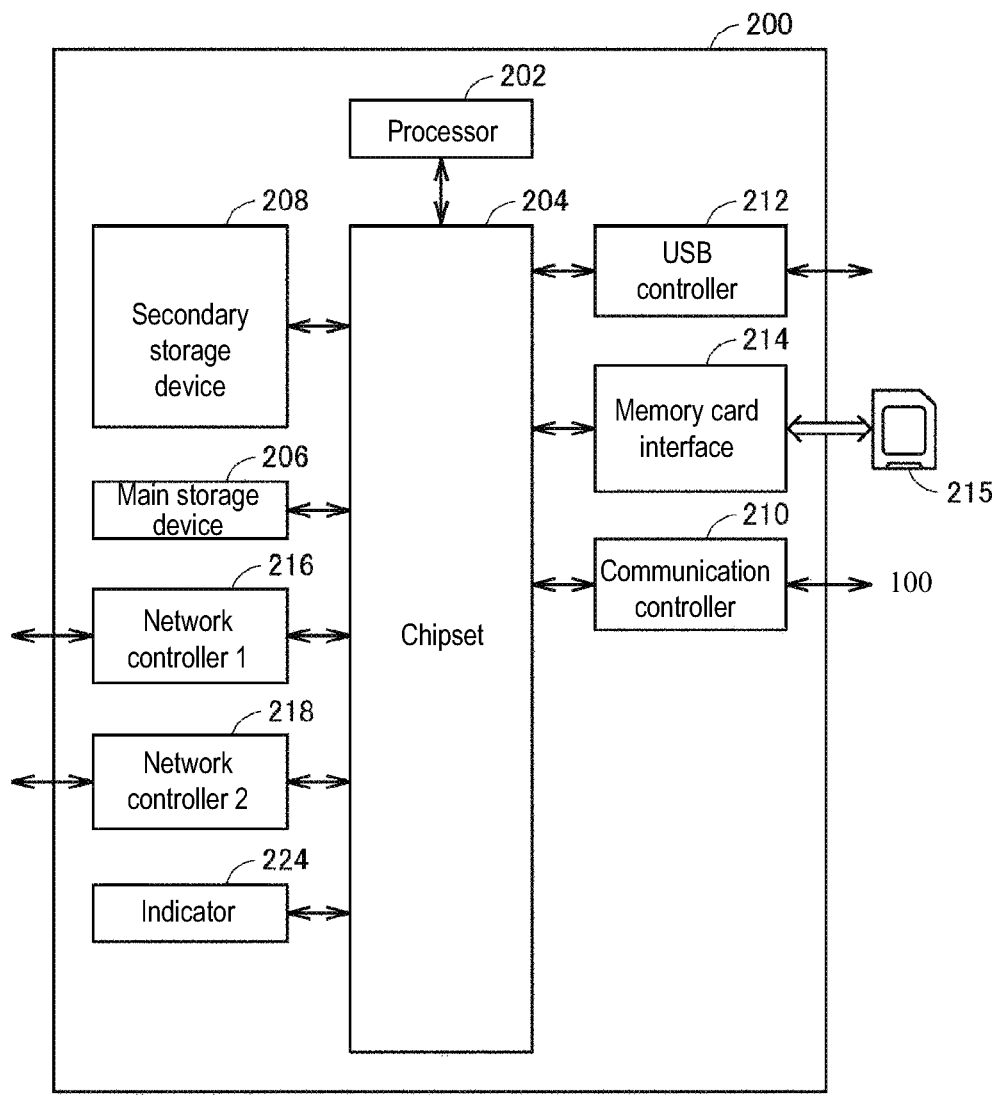
FIG. 4 is a schematic diagram illustrating a hardware configuration example of a relay unit configuring the safety system according to the present embodiment.

FIG. 4 is a schematic diagram illustrating a hardware configuration example of the relay unit 200 configuring the controller system 1 according to the present embodiment. With reference to FIG. 4, the relay unit 200 includes, principal components, a processor 202 such as a CPU or a GPU, a chipset 204, a main storage device 206, a secondary storage device 208, a communication controller 210, a communication interface 212, a memory card interface 214, network controllers 216 and 218, and an indicator 224.

The processor 202 reads various programs stored in the secondary storage device 208, loads the programs into the main storage device 206, and executes the programs to realize various communication functions that will be described later. The chipset 204 mediates exchange of data between the processor 202 and each component to realize the overall process in the relay unit 200.

The secondary storage device 208 stores not only a system program but also a communication processing program that operates in an execution environment provided by the system program.

The communication controller 210 oversees and manages exchange of data with the control unit 100. As the communication controller 210, for example, a communication chip supporting PCI Express or Ethernet may be employed in the same manner as in the communication controller 110 of the control unit 100.

The communication interface 212 performs exchange of data with any information processing device via USB connection.

The memory card interface 214 is configured to be detachably attached with a memory card 215, and can record a control program or data such as various settings on the memory card 215 or read the control program or the data such as various settings from the memory card 215.

Each of the network controllers 216 and 218 performs exchange of data with any device via a network. The network controllers 216 and 218 may employ a general-purpose network protocol such as Ethernet.

The indicator 224 provides notifications of an operation state and the like of the relay unit 200, and is configured with one or a plurality of LEDs or the like disposed on a unit surface.

FIG. 4 illustrates the configuration example in which the necessary functions are provided by the processor 202 executing the programs, but some or all of the provided functions may be installed by using a dedicated hardware circuit (for example, an ASIC or an FPGA). Alternatively, main parts of the relay unit 200 may be realized by using hardware (for example, an industrial PC based on a general-purpose PC) conforming to a general-purpose architecture. In this case, a virtualization technique may be used to execute a plurality of OSs having different uses in parallel and also to execute necessary applications on each OS.

(b3: Safety Unit 300)

Figure 5:
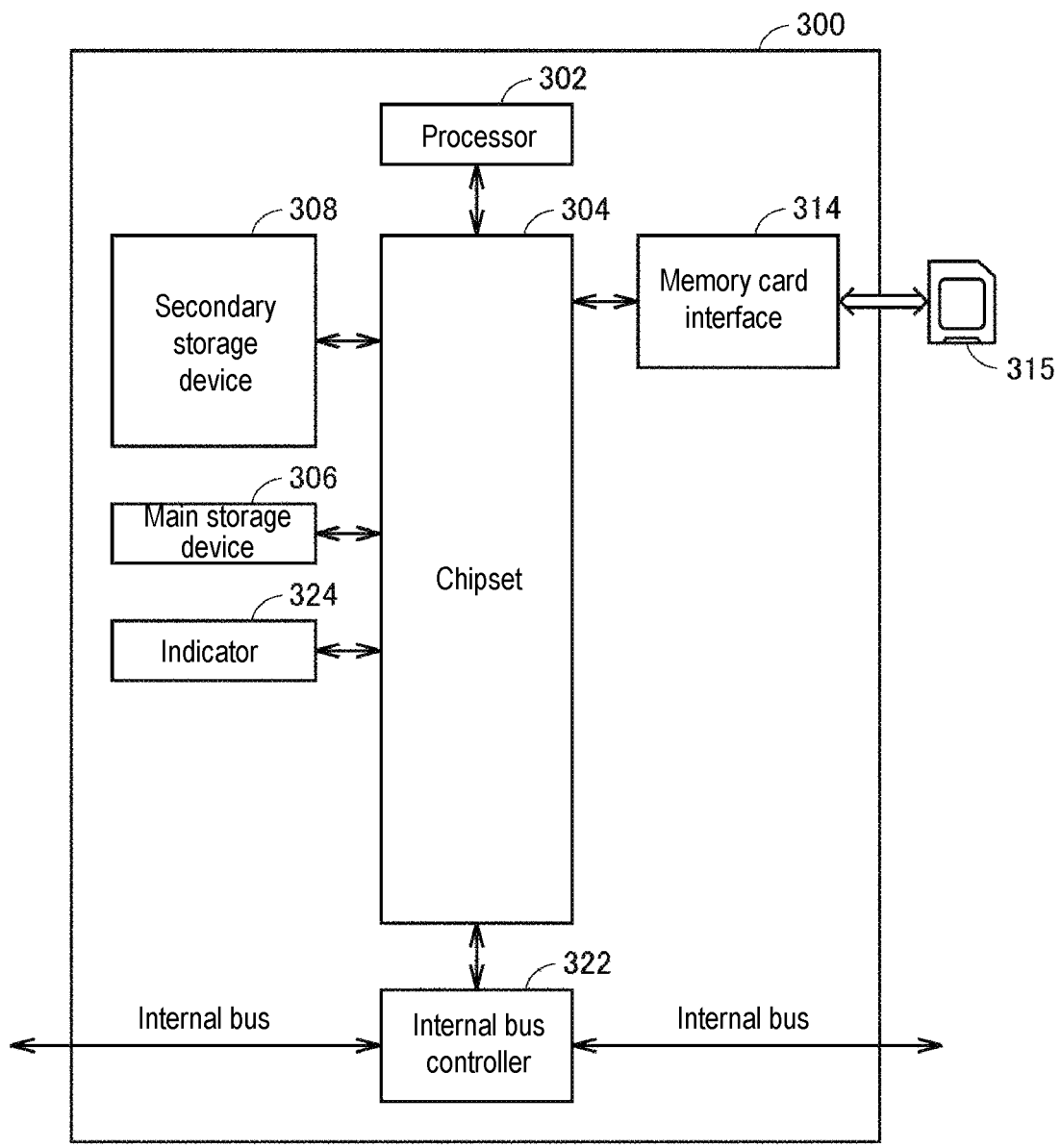
FIG. 5 is a schematic diagram illustrating a hardware configuration example of a safety unit configuring the safety system according to the present embodiment.

FIG. 5 is a schematic diagram illustrating a hardware configuration example of the safety unit 300 configuring the controller system 1 according to the present embodiment. With reference to FIG. 5, the safety unit 300 includes, principal components, a processor 302 such as a CPU or a GPU, a chipset 304, a main storage device 306, a secondary storage device 308, a memory card interface 314, an internal bus controller 322, and an indicator 324.

The processor 302 reads various programs stored in the secondary storage device 308, loads the programs into the main storage device 306, and executes the programs to realize control calculation related to the standard control and various processes that will be described later. The chipset 304 mediates exchange of data between the processor 302 and each component to realize the overall process in the safety unit 300.

The secondary storage device 308 stores not only a system program but also a safety program that operates in an execution environment provided by the system program.

The memory card interface 314 is configured to be detachably attached with a memory card 315, and can record the safety program or data such as various settings on the memory card 315 or read the safety program or the data such as various settings from the memory card 315.

The internal bus controller 322 performs exchange of data with the control unit 100 via the internal bus 10 (refer to FIG. 2).

The indicator 324 provides notifications of an operation state and the like of the safety unit 300, and is configured with one or a plurality of LEDs or the like disposed on a unit surface.

FIG. 5 illustrates the configuration example in which the necessary functions are provided by the processor 302 executing the programs, but some or all of the provided functions may be installed by using a dedicated hardware circuit (for example, an ASIC or an FPGA). Alternatively, main parts of the safety unit 300 may be realized by using hardware (for example, an industrial PC based on a general-purpose PC) conforming to a general-purpose architecture. In this case, a virtualization technique may be used to execute a plurality of OSs having different uses in parallel and also to execute necessary applications on each OS.

<C. Maintenance on Safety System 1>

Next, maintenance on the safety system 1 according to the present embodiment will be described.

Figure 6:
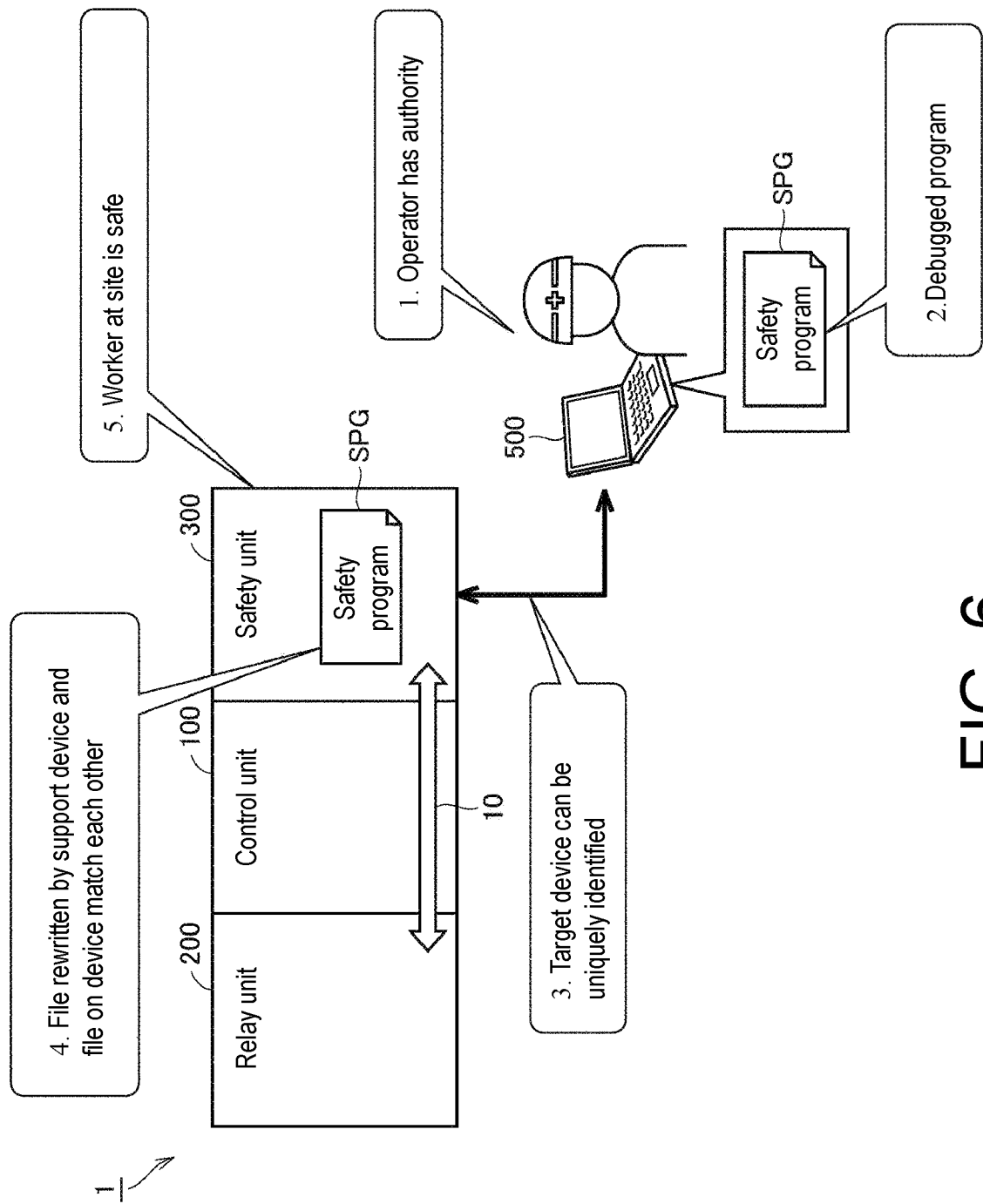
FIG. 6 is a diagram for describing maintenance requirements for the safety system according to the present embodiment.

FIG. 6 is a diagram for describing maintenance requirements for the safety system 1 according to the present embodiment. In FIG. 6, as a typical example, a case where a user program (safety program SPG) stored in the safety unit 300 (hereinafter, also referred to as a "device") is rewritten by a user program (safety program SPG) created in the support device 500 is assumed.

Requirements illustrated in FIG. 6 are defined in "6.11.2 Software Based Parameterization" of IEC 62061:2005 or the like.

1. An operator performing maintenance has authority (for example, authority confirmation using a password).

2. The safety program SPG sent from the support device 500 to a device is a debugged program.

3. A rewrite target device can be uniquely identified (for example, direct connection between the support device 500 and the device, or identification from a unique name or serial number of the target device).

4. A file rewritten by the support device 500 and a file on the device match each other (for example, confirmation using a checksum).

5. A worker at a site is safe (for example, a situation in which the workers may be injured due to malfunction or stoppage cannot occur).

As described above, stricter requirements are imposed on maintenance on the safety unit 300 that executes the safety control, not maintenance on the control unit 100 that executes the standard control.

In the present embodiment, in addition to performing maintenance at a site where the safety system 1 is disposed, it is possible to operate the support device 500 disposed at a remote location to perform maintenance on the safety system 1. Hereinafter, maintenance performed by operating the support device 500 disposed at a remote location will also be referred to as "remote maintenance".

Particularly, the above requirement 3 is preferably taken into consideration in order to realize remote maintenance on the safety unit 300. The requirements 1 and 4 are also preferably taken into consideration.

The requirement 1 "an operator performing maintenance has authority" indicates guaranteeing that a transmission source (or a sender) of the safety program SPG is correct.

The requirement 3 "a rewrite target device can be uniquely identified" indicates guaranteeing that a transmission destination of the safety program SPG is correct.

The requirement 4 "a file rewritten by the support device 500 and a file on the device match each other" indicates guaranteeing that the safety program SPG after being transmitted to the safety unit 300 is correct.

Hereinafter, a configuration for realizing remote maintenance on the safety system 1 will be described.

<D. Hardware Configuration Example of Support Device 500>

Next, a hardware configuration example of the support device 500 connected to the safety system 1 according to the present embodiment will be described.

Figure 7:
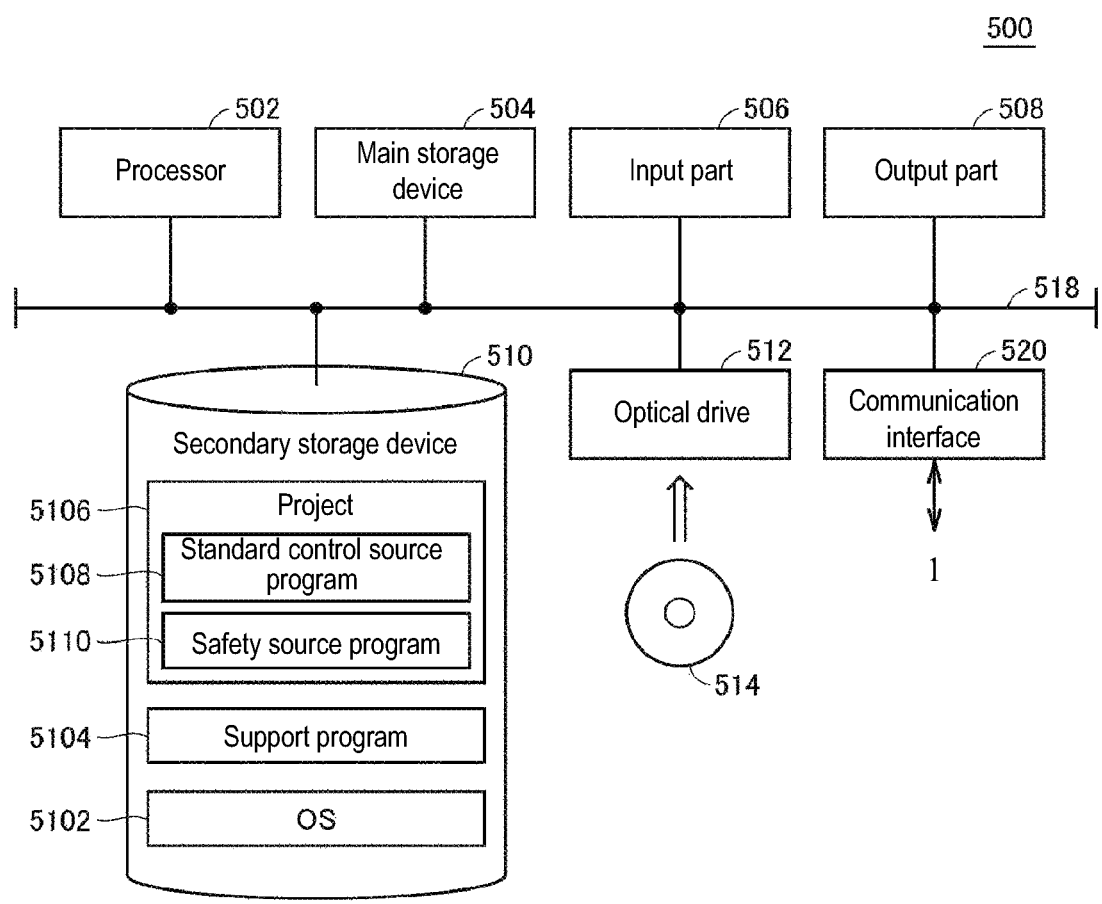
FIG. 7 is a schematic diagram illustrating a hardware configuration example of a support device connected to the safety system according to the present embodiment.

FIG. 7 is a schematic diagram illustrating a hardware configuration example of the support device 500 connected to the safety system 1 according to the present embodiment. The support device 500 is implemented by using hardware (for example, a general-purpose PC) conforming to a general-purpose architecture as an example.

With reference to FIG. 7, the support device 500 includes a processor 502 such as a CPU or a GPU, a main storage device 504, an input part 506, an output part 508, a secondary storage device 510, an optical drive 512, and a communication interface 520. These components are connected to each other via a processor bus 518.

The processor 502 reads programs (for example, an OS 5102 and a support program 5104) stored in the secondary storage device 510, loads the programs into the main storage device 504, and executes the programs to perform various processes that will be described later.

The secondary storage device 510 stores not only the OS 5102 for realizing fundamental functions but also the support program 5104 for providing functions of the support device 500. The support program 5104 is executed by an information processing device that is a computer (substantially, the processor 502) to implement the support device 500 according to the present embodiment.

The secondary storage device 510 stores a project 5106 created by a user in a development environment that is provided by executing the support program 5104. The secondary storage device 510 may store keys (a secret key and a public key), a certificate, and the like that will be described later.

In the present embodiment, the support device 500 provides a development environment in which settings for each device included in the safety system 1 and creation of a program executed by each device can be integrated. The project 5106 includes data generated by the integrated development environment. Typically, the project 5106 includes a standard control source program 5108 and a safety source program 5110.

The standard control source program 5108 is converted into object codes that are then transmitted to the control unit 100 to be stored as a standard control program. The safety source program 5110 is converted into object codes that are then transmitted to the safety unit 300 to be stored as a safety program.

The input part 506 is configured with a keyboard, a mouse, and the like, and receives a user operation. The output part 508 is configured with a display, various indicators, a printer, and the like, and outputs a processing result or the like from the processor 502.

The communication interface 520 exchanges data with the safety system 1 via any communication medium such as the USB or Ethernet.

The support device 500 has the optical drive 512, and a program is read from a recording medium 514 (for example, an optical recording medium such as a digital versatile disc (DVD)) that stores computer-readable programs in a non-transitory manner and is installed in the secondary storage device 510 or the like.

The support program 5104 or the like executed by the support device 500 may be installed via the computer-readable recording medium 514, or may be downloaded from a server device or the like on the network to be installed. The functions provided by the support device 500 according to the present embodiment may be realized in a form of using some modules provided by the OS.

FIG. 7 illustrates the configuration example in which the necessary functions of the support device 500 are provided by the processor 502 executing the programs, but some or all of the provided functions may be installed by using a dedicated hardware circuit (for example, an ASIC or an FPGA).

The support device 500 may be detached from the safety system 1 during an operation of the safety system 1.

<E. Configuration for Guaranteeing that Transmission Destination of Safety Program is Correct (Requirement 3)>

First, a configuration for realizing the requirement 3 "a rewrite target device can be uniquely identified" will be described.

(e1: Problem)

Figure 8:
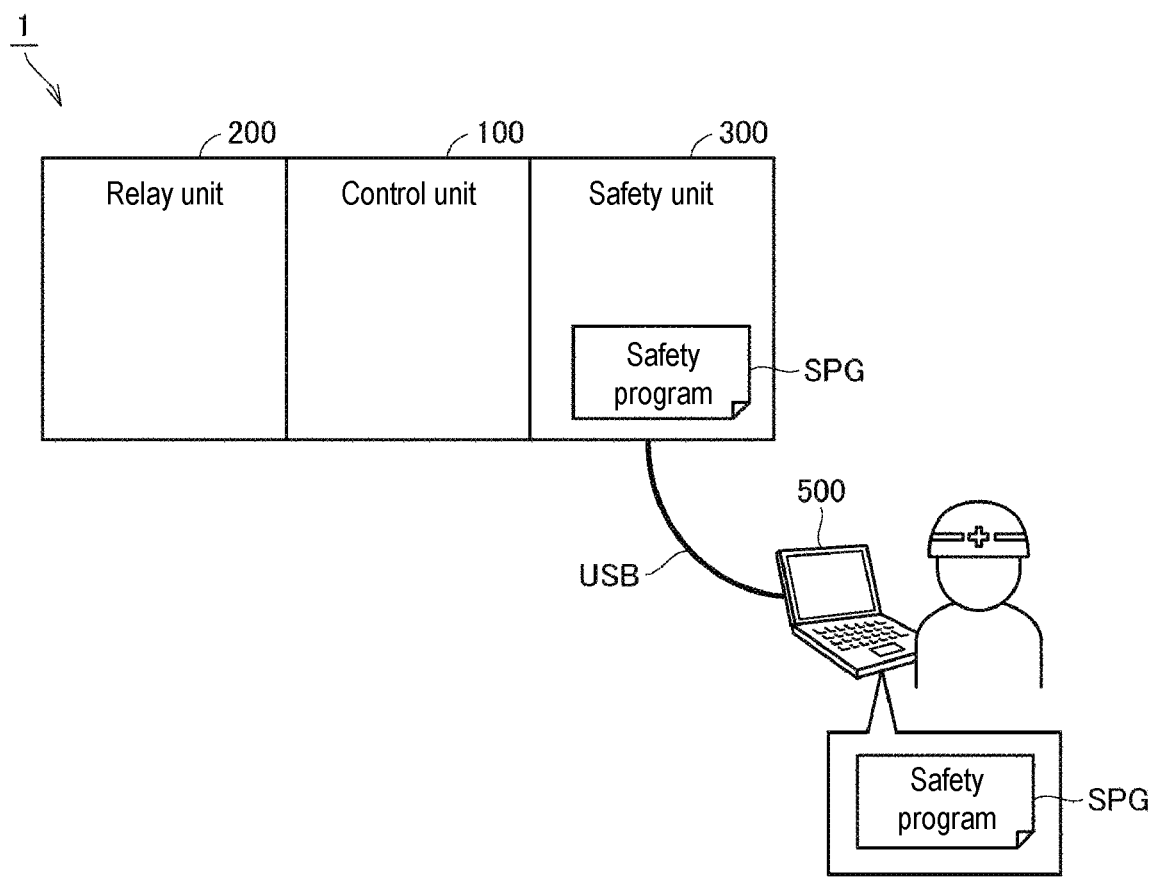
FIG. 8 is a diagram for describing maintenance performed when the safety system according to the present embodiment is directly connected to the support device.

FIG. 8 is a diagram for describing maintenance performed when the safety system 1 according to the present embodiment is directly connected to the support device 500. With reference to FIG. 8, in a case where the support device 500 and the safety system 1 (safety unit 300) are directly connected to each other at a site, an operator operating the support device 500 can visually check a device (safety unit 300) that is a connection destination and can thus uniquely identify a rewrite target device through viewing and a connection operation.

Figure 9:
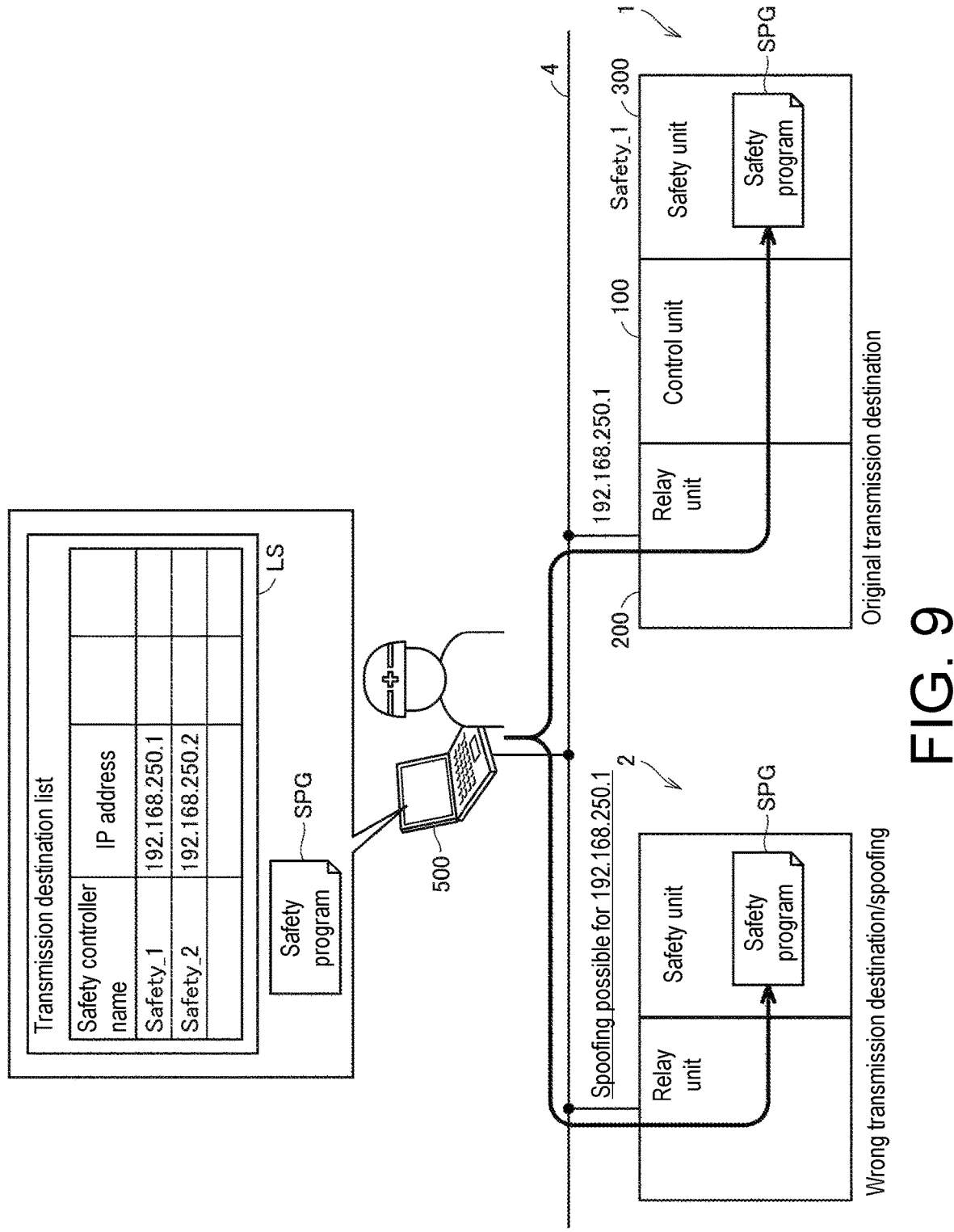
FIG. 9 is a diagram for describing a problem in remote maintenance by the support device on the safety system.

FIG. 9 is a diagram for describing a problem in remote maintenance by the support device 500 on the safety system 1. With reference to FIG. 9, it is assumed that the support device 500 is electrically connected to the safety system 1 via a network 4.

In the network 4, the safety system 1 is identified by a network address (typically, an IP address) assigned to the relay unit 200.

The support device 500 has a list LS in which the name of a device (safety unit 300) that is a transmission destination registered in advance is correlated with an IP address, and the operator selects the safety unit 300 that is a transmission destination by referring to the list LS. In the example illustrated in FIG. 9, as an IP address, "192.168.250.1" (Safety_1) is selected. The support device 500 transmits the safety program SPG to a device having the selected IP address in accordance with the operator's operation.

Here, an IP address may be freely set for each device, or may be dynamically assigned by a router or the like. Thus, there is a probability that "192.168.250.1" may be wrongly set for another safety system 2.

Alternatively, another safety system 2 may be disguised as a transmission destination due to spoofing or the like.

As described above, in a case where only an IP address is designated, it is not possible to guarantee that a transmission destination of the safety program SPG is correct due to wrong setting or spoofing. That is, even if the safety program SPG is transmitted to a wrong system, this may not be noticed.

(e2: Solution Form 1)

A form using encryption based on a key as a solution form 1 to the problem illustrated in FIG. 8 will be described.

Figure 10:
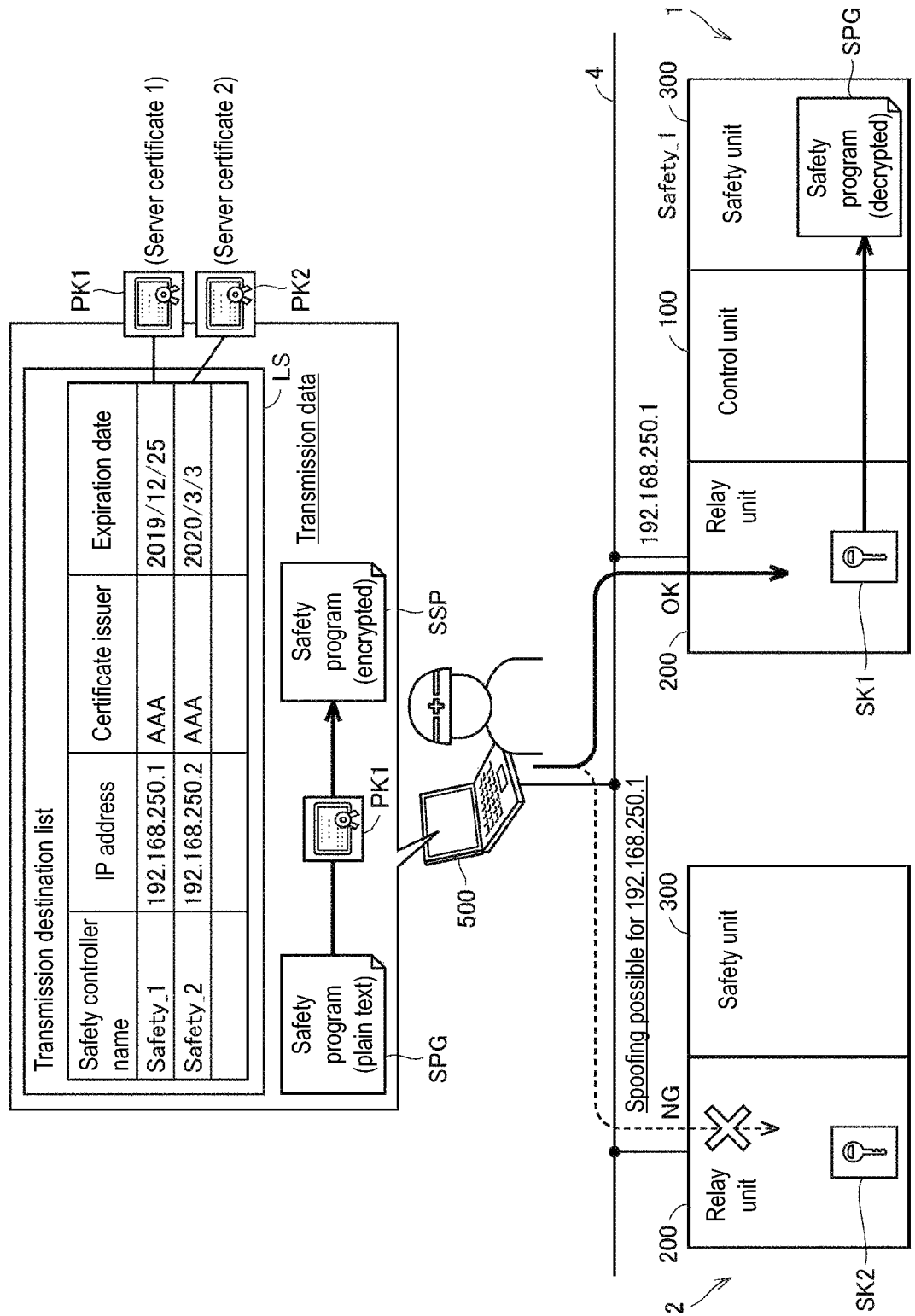
FIG. 10 is a diagram for describing a form of remote maintenance by the support device on the safety system according to the present embodiment.

FIG. 10 is a diagram for describing a form of remote maintenance by the support device 500 on the safety system 1 according to the present embodiment. In a configuration illustrated in FIG. 10, the relay unit 200 of the safety system 1 stores a key as at least part of information exchanged in advance, and the support device 500 encrypts data required for maintenance such that the data can be decrypted with the key stored in the relay unit 200, and transmits the data to the relay unit 200.

More specifically, a key pair including a secret key and a public key conforming to a public key basis is prepared in advance for the safety system 1. The secret key is stored in the relay unit 200, and the corresponding public key is stored in the support device 500.

For example, the safety system 1 (relay unit 200) having "192.168.250.1" (Safety_1) as an IP address stores a secret key SK1, and a corresponding public key PK1 is associated with the entry of "192.168.250.1" included in the list LS stored in the support device 500. In order to prevent the public key PK1 from being spoofed, a server certificate generated by a certificate authority authenticating the public key PK1 may be stored in the support device 500.

As described above, the relay unit 200 stores the secret key SK1 as a key that is information exchanged in advance. The support device 500 stores at least one of the public key PK1 forming a pair with the secret key SK1 and the server electronic certificate issued for the public key PK1.

In remote maintenance, when the safety program SPG is transmitted to a device having the selected IP address in accordance with the operator's operation, the support device 500 encrypts the safety program SPG with a public key of the selected transmission destination. An encrypted safety program SSP (transmission data) that is generated through the encryption is transmitted to the transmission destination.

In a case where the encrypted safety program SSP (transmission data) is transmitted to the safety system 1 that is an original transmission destination, the safety program SSP can be decrypted by using the secret key SK1 stored in the relay unit 200 of the safety system 1.

On the other hand, in a case where the encrypted safety program SSP (transmission data) is transmitted to the safety system 2 that is a wrong transmission destination, the safety program SSP cannot be decrypted with a secret key SK2 stored in the relay unit 200 of the safety system 2. Alternatively, it is supposed that the relay unit 200 of the safety system 2 does not store any secret key, and, also in this case, the transmission data cannot be decrypted.

Even if the transmission data is received in any method, the transmission data cannot be decrypted in the safety system 2.

As described above, only when transmission data is transmitted to the safety system 1 having a key associated with a selected transmission destination in advance, the transmission data can be decrypted in the transmission destination, and thus the support device 500 does not transmit the safety program SPG to a wrong transmission destination. Consequently, even if there is setting of a wrong IP address in a transmission destination or spoofing of an IP address, the safety program SPG can be transmitted to a correct transmission destination. In a case where data (encrypted safety program SSP) transmitted from the support device 500 can be decrypted with the secret key SK1, the relay unit 200 transmits the decrypted data (safety program SPG) to the safety unit 300.

Figure 11:
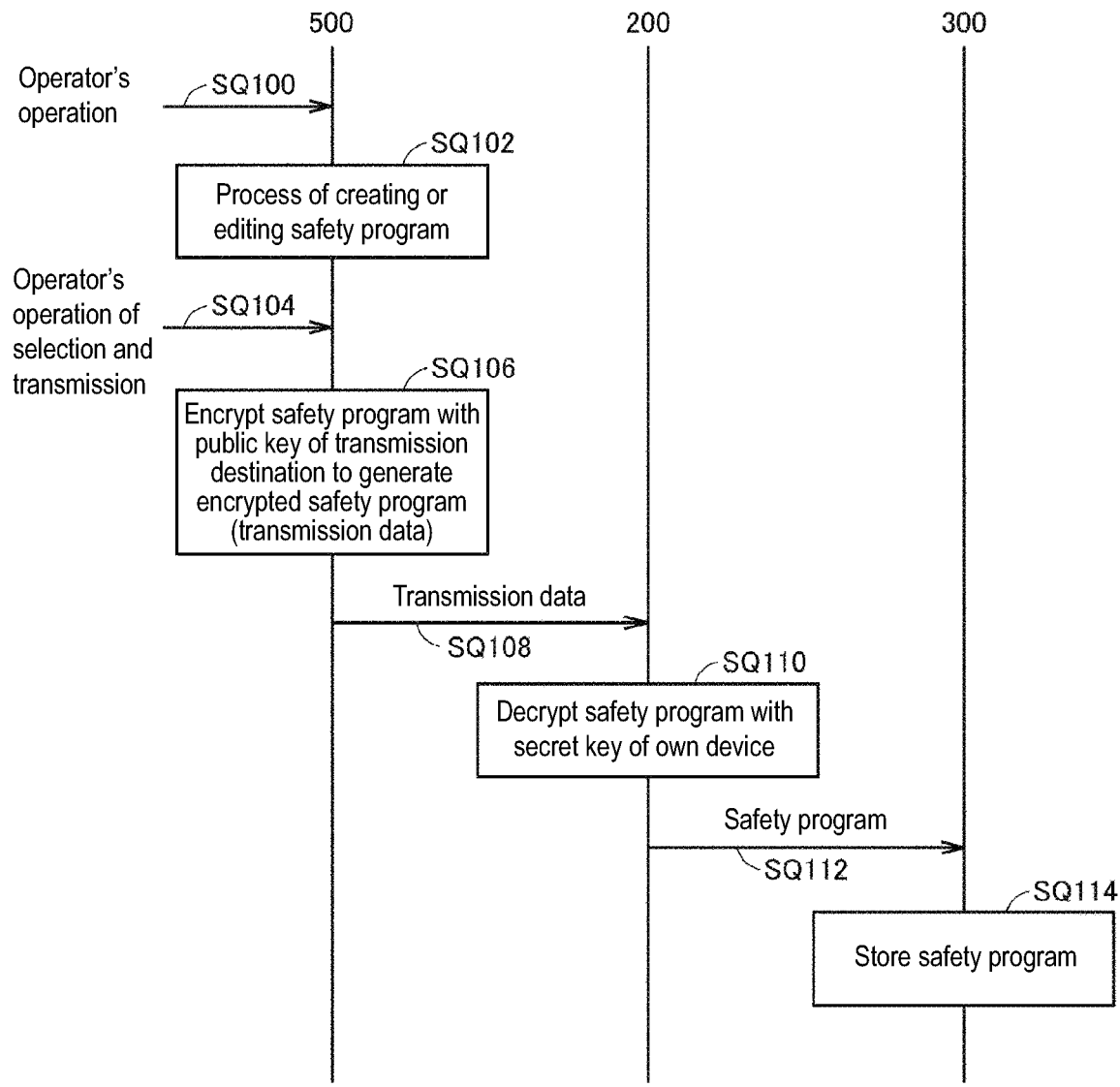
FIG. 11 is a sequence diagram illustrating process procedures in the remote maintenance illustrated in FIG. 10.

FIG. 11 is a sequence diagram illustrating process procedures in the remote maintenance illustrated in FIG. 10. With reference to FIG. 11, the support device 500 executes a process (sequence SQ102) of creating or editing the safety program SPG in accordance with an operator's operation (sequence SQ100) on the support device 500.

Next, in accordance with the operator's operation of selection of a transmission destination and transmission (sequence SQ104), the support device 500 connects the selected relay unit 200 to the network, and encrypts the safety program SPG with a public key of the transmission destination to generate the encrypted safety program SSP (transmission data) (sequence SQ106). The support device 500 transmits the transmission data to the selected transmission destination (sequence SQ108). In other words, the support device 500 executes maintenance including an addition or a change with respect to the safety program SPG in accordance with a user operation.

When the transmission data is received from the support device 500, the relay unit 200 that is the transmission destination decrypts the received data into the safety program SPG with the secret key SK1 of the own device (sequence SQ110). The relay unit 200 transmits the decrypted safety program SPG to the safety unit 300 (sequence SQ112). The transmission of the safety program SPG from the relay unit 200 to the safety unit 300 is executed via the internal bus 10.

As described above, the support device 500 and the relay unit 200 identify each other by using the information exchanged in advance, and exchange data required for maintenance.

The safety unit 300 stores the safety program SPG from the relay unit 200 (sequence SQ114). The safety unit 300 executes the safety control according to the stored safety program SPG Consequently, the remote maintenance by the support device 500 on the safety unit 300 is completed.

The relay unit 200 may execute virus scanning or the like on the decrypted safety program SPG and then transmit the safety program SPG to the safety unit 300. This is executed by taking into consideration that the safety program SPG may be infected with virus immediately before encryption in the support device 500.

(e3: Solution form 2)

In the above solution form 1, the configuration of generating transmission data by using a public key of a transmission destination has been exemplified, but a public key may be further used from the viewpoint of increasing a transmission speed by making processes related to encryption and decryption efficient.

Figure 12:
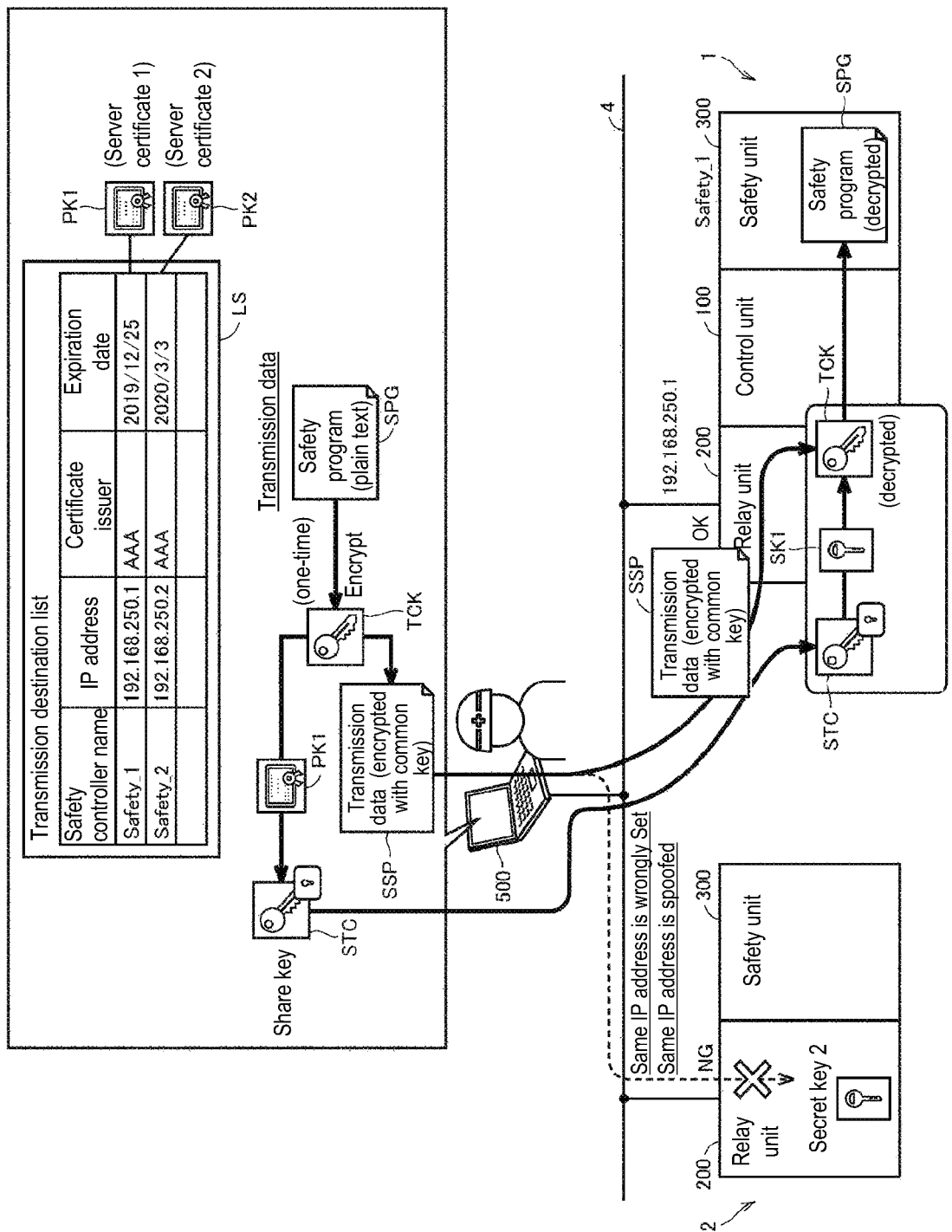
FIG. 12 is a diagram for describing another form of remote maintenance by the support device on the safety system according to the present embodiment.

FIG. 12 is a diagram for describing another form of remote maintenance by the support device 500 on the safety system 1 according to the present embodiment. Also in a configuration illustrated in FIG. 12, in the same manner as in the configuration illustrated in FIG. 10, a key pair including a secret key and a public key is prepared in advance for the safety system 1.

First, in the support device 500, the safety program SPG is encrypted with a common key TCK that is a one-time key generated every time, and thus the encrypted safety program SSP (transmission data) is generated. The common key TCK is encrypted with a public key of a selected transmission destination, and thus an encrypted common key STC is generated.

The encrypted safety program SSP and the encrypted common key STC are transmitted to a transmission destination selected by the support device 500.

As described above, the support device 500 generates the common key TCK that is a one-time key in a case where it is necessary to transmit data required for maintenance. The support device 500 encrypts the data required for the maintenance with the common key TCK, also encrypts the common key TCK to be decryptable with a key (secret key SK1) stored in the relay unit 200, and transmits the data and the common key to the relay unit 200.

On the other hand, the relay unit 200 of the safety system 1 that is the transmission destination decrypts the encrypted common key STC received from the support device 500 into the common key TCK with the secret key SK1 of the own device. The relay unit 200 of the safety system 1 that is the transmission destination decrypts the encrypted safety program SSP (transmission data) received from the support device 500 into the safety program SPG with the decrypted common key TCK.

On the other hand, in a case where the encrypted safety program SSP and the encrypted common key STC are transmitted to the safety system 2 that is a wrong transmission destination, the safety program SSP and the common key STC cannot be decrypted with the secret key SK2 stored in the relay unit 200 of the safety system 2. Alternatively, it is supposed that the relay unit 200 of the safety system 2 does not store any secret key, and, also in this case, the transmission data cannot be decrypted.

Even if the data is received in any method from the support device 500, the transmission data cannot be decrypted in the safety system 2.

As described above, only when transmission data is transmitted to the safety system 1 having a key associated with a selected transmission destination in advance, the transmission data can be decrypted in the transmission destination, and thus the support device 500 does not transmit the safety program SPG to a wrong transmission destination. Consequently, even if there is setting of a wrong IP address in a transmission destination or spoofing of an IP address, the safety program SPG can be transmitted to a correct transmission destination.

Figure 13:
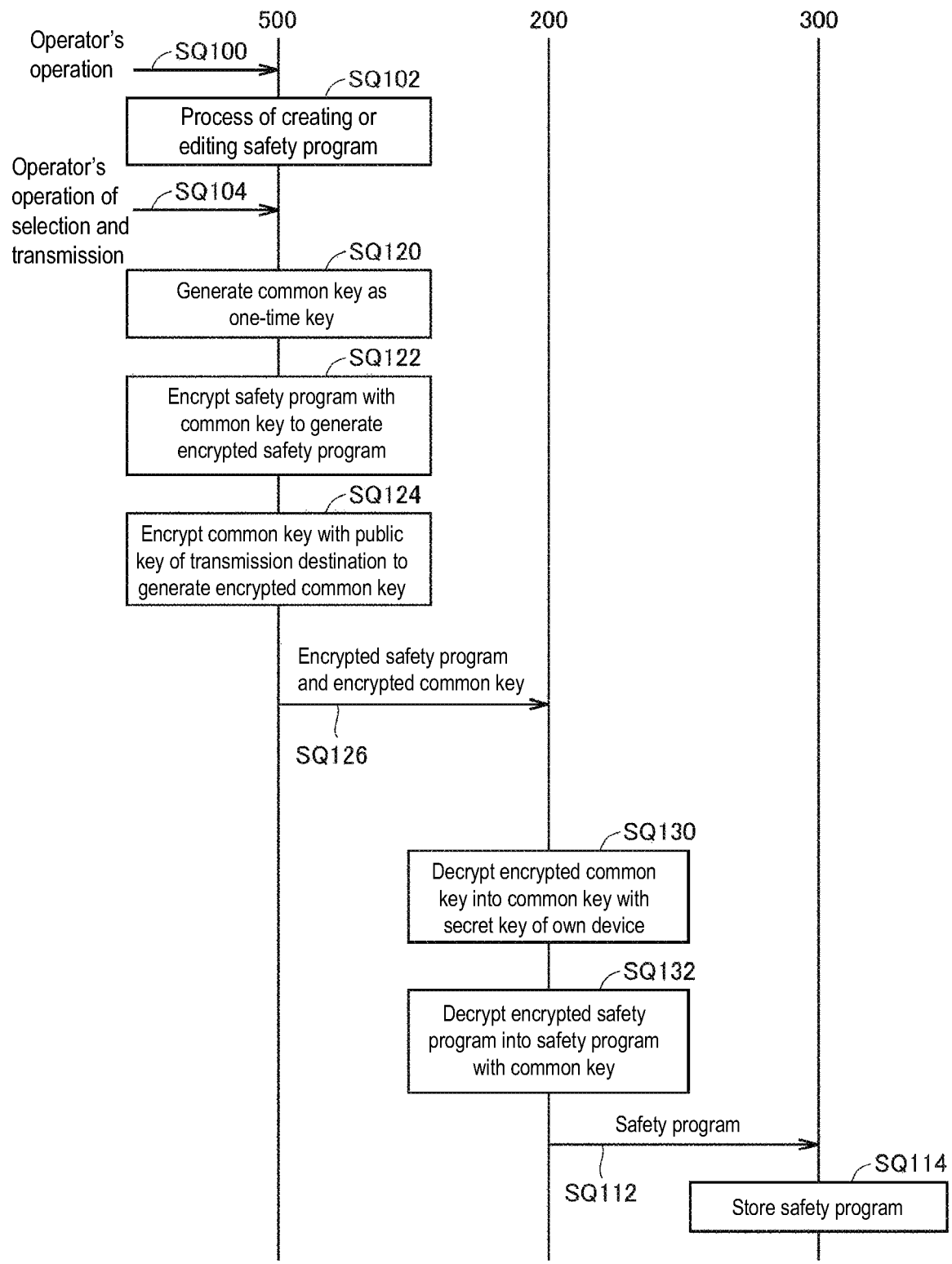
FIG. 13 is a sequence diagram illustrating process procedures in the remote maintenance illustrated in FIG. 12.

FIG. 13 is a sequence diagram illustrating process procedures in the remote maintenance illustrated in FIG. 12. With reference to FIG. 13, the support device 500 executes a process (sequence SQ102) of creating or editing the safety program SPG in accordance with an operator's operation (sequence SQ100) on the support device 500.

Next, in accordance with the operator's operation of selection of a transmission destination and transmission (sequence SQ104), the support device 500 generates the common key TCK as a one-time key (sequence SQ120). The support device 500 encrypts the safety program SPG with the generated common key TCK to generate the encrypted safety program SSP (transmission data) (sequence SQ122). The support device 500 encrypts the common key TCK with a public key of the transmission destination to generate the encrypted common key STC (sequence SQ124).

Finally, the support device 500 transmits the encrypted safety program SSP and the encrypted common key STC to the selected transmission destination (sequence SQ126).

When the encrypted common key STC is received from the support device 500, the relay unit 200 that is the transmission destination decrypts the encrypted common key STC that has been received into the common key TCK with the secret key SK1 of the own device (sequence SQ130).

The relay unit 200 decrypts the encrypted safety program SSP (transmission data) into the safety program SPG with the common key TCK (sequence SQ132).

Finally, the relay unit 200 transmits the decrypted safety program SPG to the safety unit 300 (sequence SQ112). The transmission of the safety program SPG from the relay unit 200 to the safety unit 300 is executed via the internal bus 10.

The safety unit 300 stores the safety program SPG from the relay unit 200 (sequence SQ114). The safety unit 300 executes the safety control according to the stored safety program SPG Consequently, the remote maintenance by the support device 500 on the safety unit 300 is completed.

(e4: Use of Certificate Authority)

A public key of each device used by the support device 500 may be directly or indirectly acquired from the safety system 1 (or the relay unit 200) that is a transmission destination. Alternatively, a public key may be registered in a certificate authority (CA), and a server certificate for the public key issued by the certificate authority may be used as a public key of each device. A public key can be prevented from being spoofed by using the certificate authority.

<F. Mutual Authentication>

Next, a mutual authentication process between the safety system 1 (relay unit 200) and the support device 500 will be described. More specifically, a method of (1) guaranteeing the validity of a transmission destination seen from the support device 500 and/or (2) guaranteeing the validity of the support device 500 seen from the transmission destination will be described. Only one or both of such mutual authentication processes may be performed depending on an environment in which the safety system 1 is provided.

(f1: Guaranteeing of Validity of Transmission Destination Seen from Support Device 500)

Figure 14:
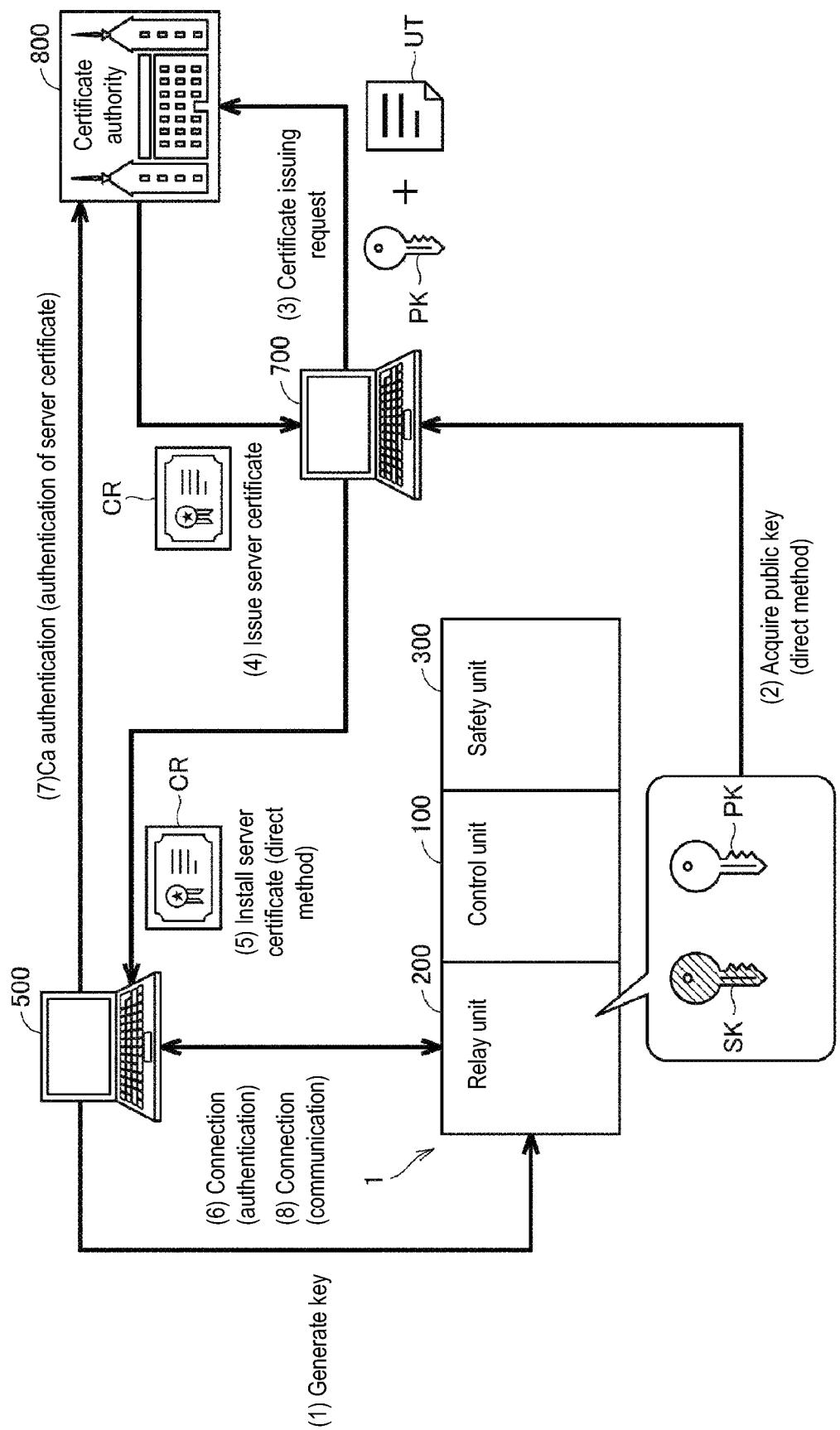
FIG. 14 is a diagram for describing a process of guaranteeing the validity of a transmission destination seen from the support device in the safety system according to the present embodiment.

FIG. 14 is a diagram for describing a process of guaranteeing the validity of a transmission destination seen from the support device 500 in the safety system 1 according to the present embodiment. FIG. 14 illustrates a method of guaranteeing that a valid public key (server certificate) of a transmission destination candidate device is installed in the support device 500. In other words, FIG. 14 illustrates a series of process procedures such as generation, distribution, and authentication of a public key of a transmission destination.

First, the support device 500 instructs the relay unit 200 that is a transmission destination candidate device to generate a key pair (a secret key SK and a public key PK) ((1) key generation). The relay unit 200 generates the key pair (the secret key SK and the public key PK) in accordance with the instruction.

Next, the public key PK generated in the relay unit 200 is acquired by using an information processing device 700 for supporting generation, distribution, and the like of the server certificate (public key) ((2) acquisition of public key). The public key PK is acquired by the information processing device 700 from the relay unit 200 according to a direct method. The direct method is supposed to be, for example, a method in which the relay unit 200 and the information processing device 700 are directly connected to each other via a USB cable or the like and the public key PK stored in the relay unit 200 is acquired, or a method in which an SD card is attached to the relay unit 200, the stored public key PK is acquired, then the SD card is attached to the information processing device 700, and the public key PK is transferred. Such a direct method is employed, and thus a correspondence relationship between the target relay unit 200 and the public key PK can be maintained.

The information processing device 700 transmits a certificate issuing request including the public key PK acquired from the relay unit 200 and user information UT to a certificate authority 800 ((3) certificate issuing request). The certificate authority 800 generates a server certificate CR corresponding to the public key PK and provides a response to the information processing device 700 ((4) issuing of server certificate).

The server certificate CR is transmitted from the information processing device 700 to the support device 500 according to a direct method ((5) server certificate installation). A direct method between the information processing device 700 and the support device 500 is the same as described above, and is supposed to be a method in which the information processing device 700 and the support device 500 are directly connected to each other via a USB cable or the like, or a method using a recording medium such as a USB memory or a SD card. Such a direct method is employed, and thus a correspondence relationship between the target relay unit 200 and the server certificate CR can be maintained.

Next, the support device 500 acquires the public key PK from the relay unit 200 ((8) connection (authentication)). The support device 500 transmits the acquired public key PK and the installed server certificate CR to the certificate authority 800 and requests authentication of the validity of the server certificate CR ((7) CA authentication (authentication of server certificate)).

Through the above procedures (1) to (7), it is possible to guarantee that the server certificate CR installed in the support device 500 corresponds to the public key PK of the specific relay unit 200. In other words, the validity of the relay unit 200 that is the transmission destination can be guaranteed by the server certificate CR. The support device 500 identifies the safety system 1 (relay unit 200) by using the installed server certificate CR (equivalent to the public key PK) and performs communication therewith ((8) connection (communication)).

In a case where the information processing device 700 issues the server certificate CR and the support device 500 executes authentication of the server certificate CR, the certificate authority 800 may be omitted. The certificate authority 800 may be a public certificate authority that is accessible via the Internet, and may be a private certificate authority that is disposed in a local network including the safety system 1.

(f2: Guaranteeing of Validity of Support Device 500 Seen from Transmission Destination)

Figure 15:
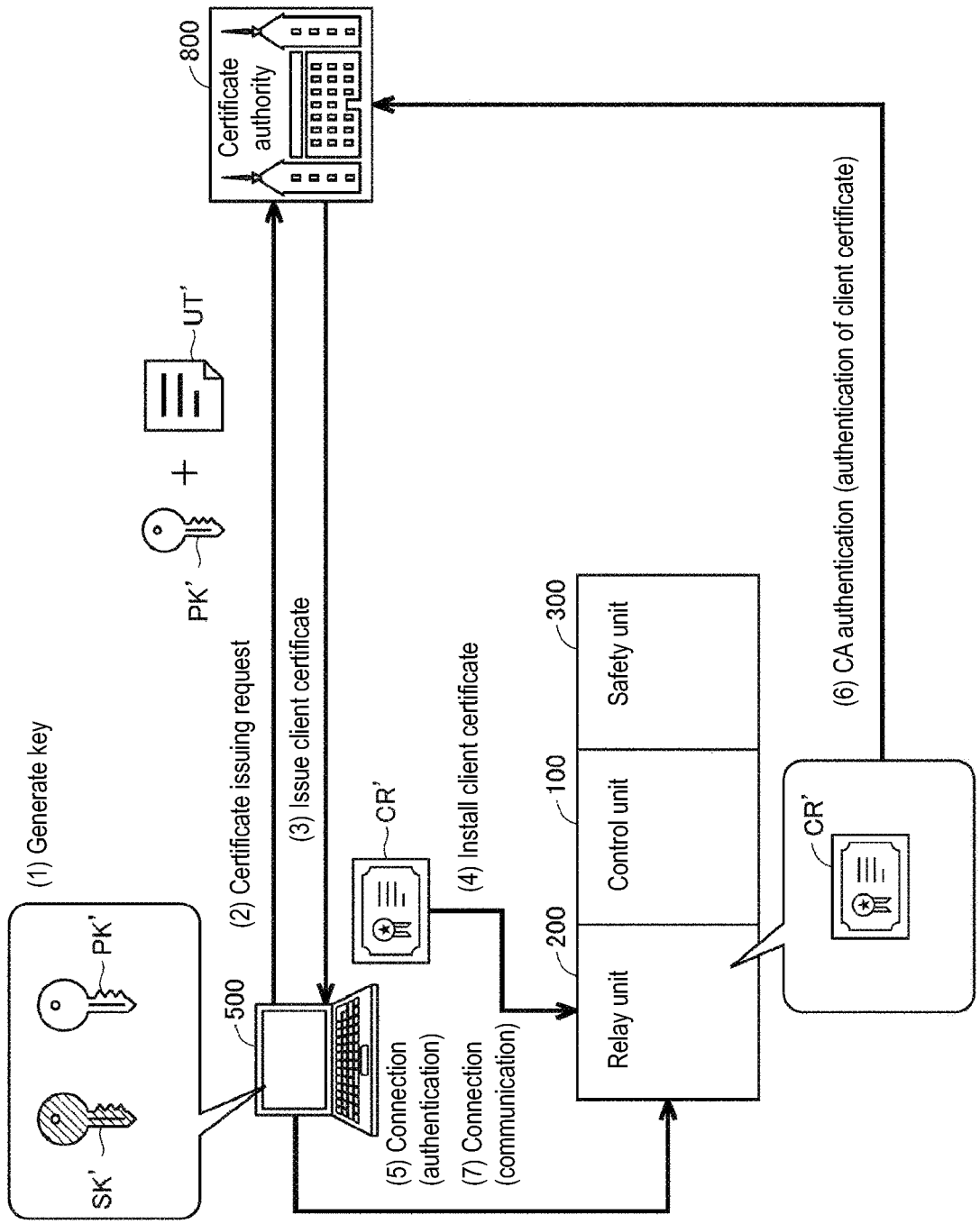
FIG. 15 is a diagram for describing a process of guaranteeing the validity of the support device seen from a transmission destination in the safety system according to the present embodiment.

FIG. 15 is a diagram for describing a process of guaranteeing the validity of the support device 500 seen from a transmission destination in the safety system 1 according to the present embodiment. FIG. 15 illustrates a method of guaranteeing that a valid public key (server certificate) of the support device 500 that is a transmission source is installed in the relay unit 200. In other words, FIG. 15 illustrates a series of process procedures such as generation, distribution, and authentication of a public key of a transmission source.

First, the support device 500 generates a key pair (a secret key SK' and a public key PK') for the support device ((1) key generation). Next, the support device 500 transmits a certificate issuing request including the public key PK' generated thereby and user information UT' to the certificate authority 800 ((2) certificate issuing request). The certificate authority 800 generates a client certificate CR' corresponding to the public key PK' and provides a response to the support device 500 ((3) issuing of client certificate).

The client certificate CR' is transmitted from the support device 500 to the relay unit 200 according to a direct method ((4) client certificate installation). A direct method between the support device 500 and the relay unit 200 is the same as described above, and is supposed to be a method in which the support device 500 and the relay unit 200 are directly connected to each other via a USB cable or the like, or a method using a recording medium such as a USB memory or a SD card. Such a direct method is employed, and thus a correspondence relationship between the support device 500 and the target relay unit 200 can be maintained.

Next, the support device 500 transmits the public key PK' to the relay unit 200 ((5) connection (authentication)). The relay unit 200 transmits the transmitted public key PK' and the installed client certificate CR' to the certificate authority 800 and requests authentication of the validity of the client certificate CR' ((6) CA authentication (authentication of client certificate)).

Through the above procedures (1) to (6), it is possible to guarantee that the client certificate CR' installed in the relay unit 200 corresponds to the public key PK' of the specific support device 500. In other words, the validity of the support device 500 that is the transmission source can be guaranteed by the client certificate CR'. The safety system 1 (relay unit 200) identifies the support device 500 that is the transmission source by using the installed client certificate CR' (equivalent to public key PK') and performs communication therewith ((7) connection (communication)).

In a case where the support device 500 issues the client certificate CR' and the relay unit 200 executes authentication of the client certificate CR', the certificate authority 800 may be omitted. The certificate authority 800 may be a public certificate authority that is accessible via the Internet, and may be a private certificate authority that is disposed in a local network including the safety system 1.

<G. Guaranteeing of Configuration>

In the safety system 1 illustrated in FIG. 1, the relay unit 200 stores a secret key, and a safety program is transmitted from the relay unit 200 to the safety unit 300 via the internal bus 10. When various security threats are taken into consideration, the safety unit 300 connected to the relay unit 200 may be replaced after the relay unit 200 generates a secret key. When these threats are supposed, it is preferable to guarantee that a combination between the relay unit 200 and the safety unit 300 is maintained.

Figure 16:
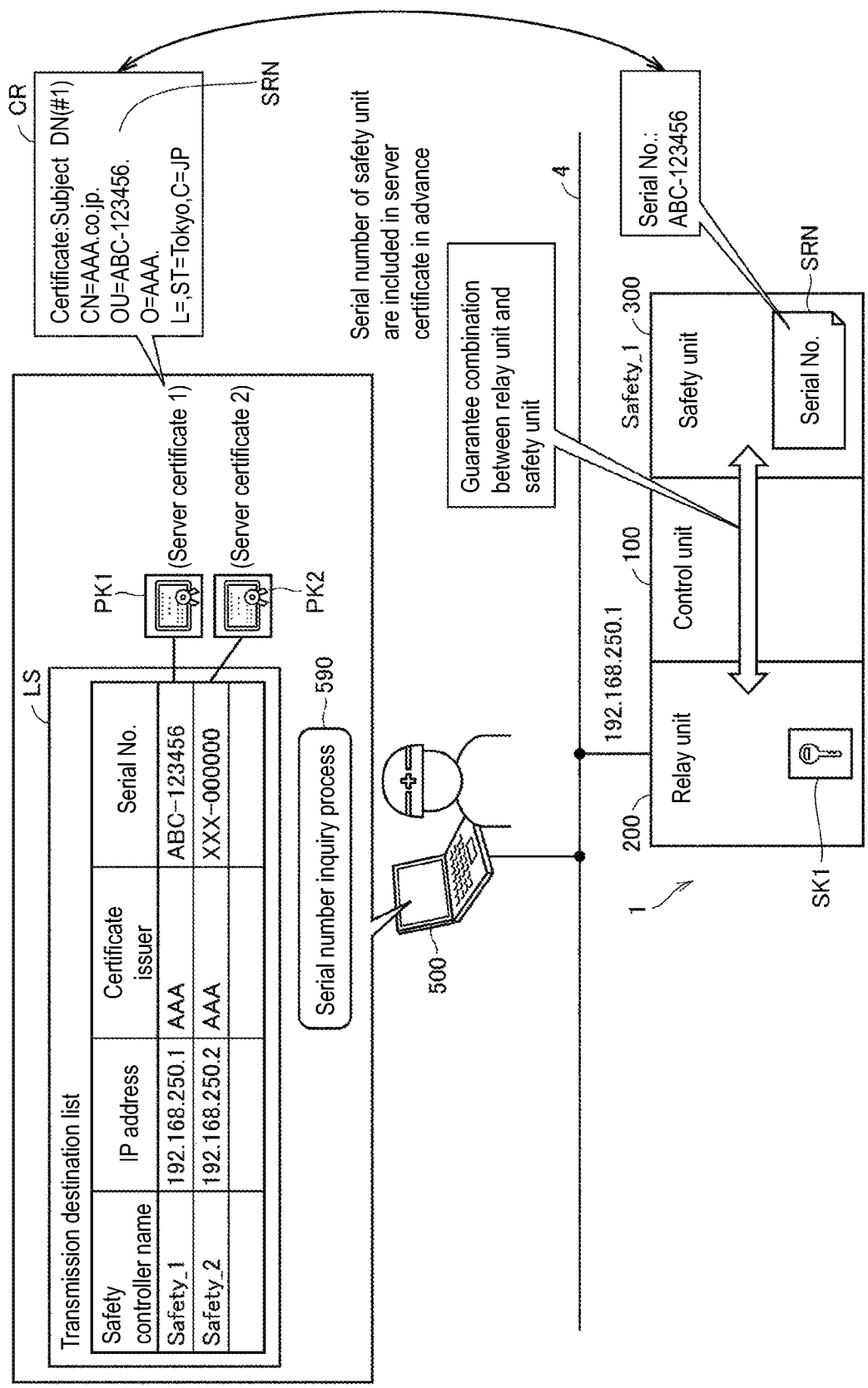
FIG. 16 is a diagram for describing a process for guaranteeing a combination between the relay unit and the safety unit in the safety system according to the present embodiment.

FIG. 16 is a diagram for describing a process for guaranteeing a combination between the relay unit 200 and the safety unit 300 in the safety system 1 according to the present embodiment. With reference to FIG. 16, when the server certificate CR corresponding to the secret key SK1 stored in the safety system 1 (relay unit 200) is generated, identification information (typically, a serial number or the like of the safety unit 300) of the safety unit 300 connected to the relay unit 200 may be included in advance.

As illustrated in FIG. 16, for example, a serial number SRN of the safety unit 300 as part of a subject may be included. In other words, the support device 500 stores the server certificate CR that is an electronic certificate issued for the public key PK1 forming a pair with the secret key SK1 stored in the relay unit 200. The server certificate CR includes a serial number SRN of the safety unit 300, which is an example of identification information for identifying the safety unit 300.

The generation of the server certificate CR including the serial number SRN may be realized, for example, by transmitting the user information UT including the serial number SRN of the safety unit 300 to the certificate authority 800 when the relay unit 200 receives an instruction for transmitting a certificate issuing request from the support device 500 or other information processing devices.

The support device 500 checks the identity of a configuration of a transmission destination before transmitting the safety program SPG, by using the server certificate CR (equivalent to a public key corresponding to a transmission destination device) including the serial number SRN of the safety unit 300.

More specifically, the support device 500 executes a serial number inquiry process 590 before transmitting the safety program SPG In the serial number inquiry process 590, the serial number SRN included in the server certificate CR is compared with the serial number SRN of the safety unit 300 acquired from the safety system 1 that is a transmission destination. As described above, the support device 500 determines whether or not identification information (serial number SRN) of the safety unit 300 acquired via the relay unit 200 matches identification information (serial number SRN) included in the server certificate CR before transmitting data required for maintenance.

In a case where both of the identification information match each other, the process of transmitting the safety program SPG is continued. In other words, the support device 500 may transmit data required for maintenance to the relay unit 200 under the condition that identification information (serial number SRN) of the safety unit 300 acquired via the relay unit 200 matches identification information (serial number SRN) included in the server certificate CR.

In contrast, in a case where both of the identification information do not match each other, this indicates that a configuration when the server certificate CR is issued has been changed, and any of the following processes may be executed.

(1) In a case where the serial numbers SRN do not match each other, transmission of the safety program SPG is stopped. A warning is output via a display or the like of the support device 500.

(2) The process of transmitting the safety program SPG is continued on condition that an operator performs an explicit operation while outputting a warning via the display or the like of the support device 500.

(3) Information such as mismatch between the serial numbers SRN is stored as a log while continuing the process of transmitting the safety program SPG Processes other than the above (1) to (3) may be executed, and two or more of the above (1) to (3) may be freely combined with each other.

It is supposed that the reason why the serial numbers SRN do not match each other is not only illegal replacement but also replacement due to a failure. It is also supposed that a combination of the safety system 1 is changed due to facility improvement. Thus, such a structure in which transmission of the safety program SPG can be continued while outputting a warning or the like may be provided instead of unconditionally stopping the transmission of the safety program SPG FIG. 17 is a sequence diagram for describing process procedures for guaranteeing a combination between the relay unit 200 and the safety unit 300 in the safety system 1 according to the present embodiment.

Figure 17:
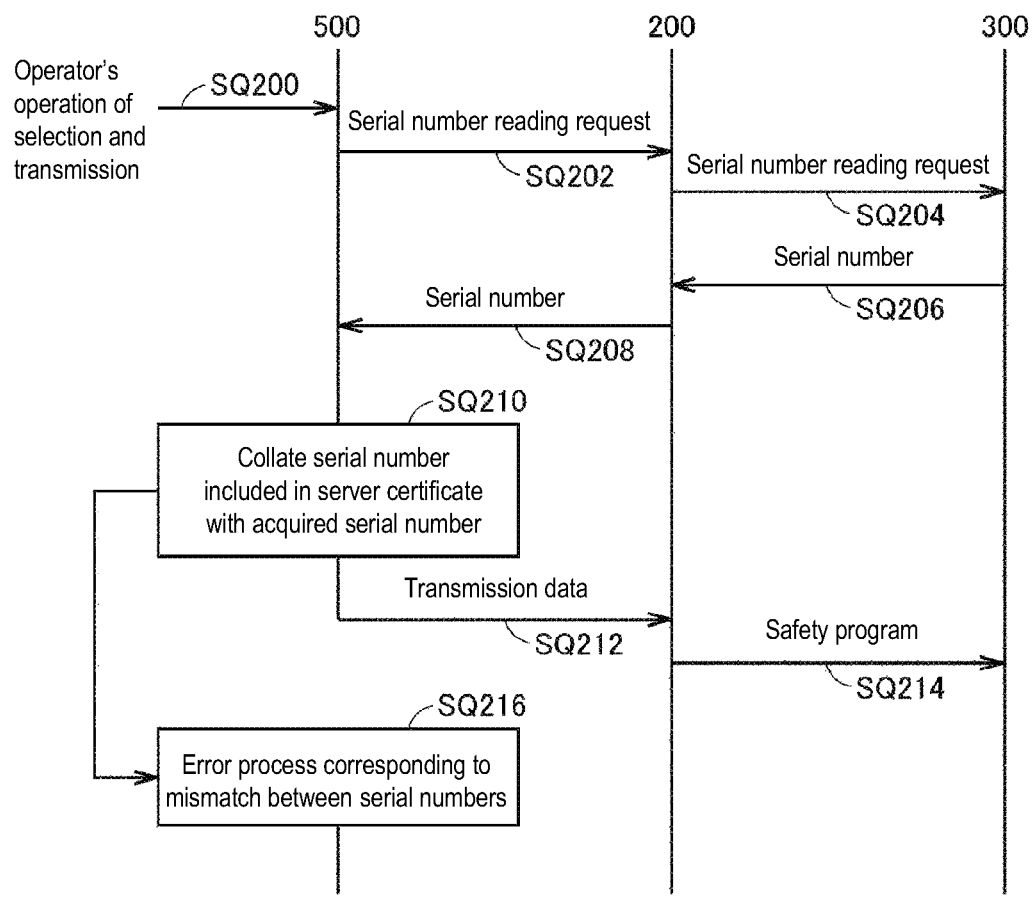
FIG. 17 is a sequence diagram for describing process procedures for guaranteeing a combination between the relay unit and the safety unit in the safety system according to the present embodiment.

With reference to FIG. 17, when an operation of selection of a transmission destination and transmission is received from the operator (sequence SQ200), the support device 500 transmits a serial number reading request for acquiring the serial number SRN of the safety unit 300 to the relay unit 200 (sequence SQ202). The relay unit 200 transmits the serial number reading request from the support device 500 to the safety unit 300 (sequence SQ204).

The safety unit 300 transmits the serial number SRN to the relay unit 200 in response to the serial number reading request (sequence SQ206). The relay unit 200 transmits the serial number SRN from the safety unit 300 to the support device 500.

When the serial number SRN is acquired from the relay unit 200, the support device 500 collates whether or not the serial number SRN included in the server certificate CR matches the acquired serial number SRN (sequence SQ210).

When both of the serial numbers SRN match each other, the support device 500 transmits transmission data obtained by encrypting the safety program SPG to the relay unit 200 (sequence SQ212). The relay unit 200 decrypts the transmission data received from the support device 500 into the safety program SPG, and transmits the safety program SPG to the safety unit 300 (sequence SQ214). The safety unit 300 executes safety control according to the new received safety program SPG In contrast, when both of the serial numbers SRN do not match each other, the support device 500 executes an error process corresponding to mismatch between the serial numbers SRN (sequence SQ216).

The above-described process and function are employed, and thus it is possible to guarantee that a combination between the relay unit 200 and the safety unit 300 that is an actual transmission destination is maintained.

<H. Configuration (Requirement 1) for Guaranteeing Authority of Operator Performing Maintenance and Configuration (Requirement 4) for Guaranteeing Identity of Rewritten File>

Next, configurations for realizing the requirement 1 "an operator performing maintenance has authority" and the requirement 4 "a file rewritten by the support device 500 and a file on the device match each other" will be described.

(h1: Problem)

Figure 18:
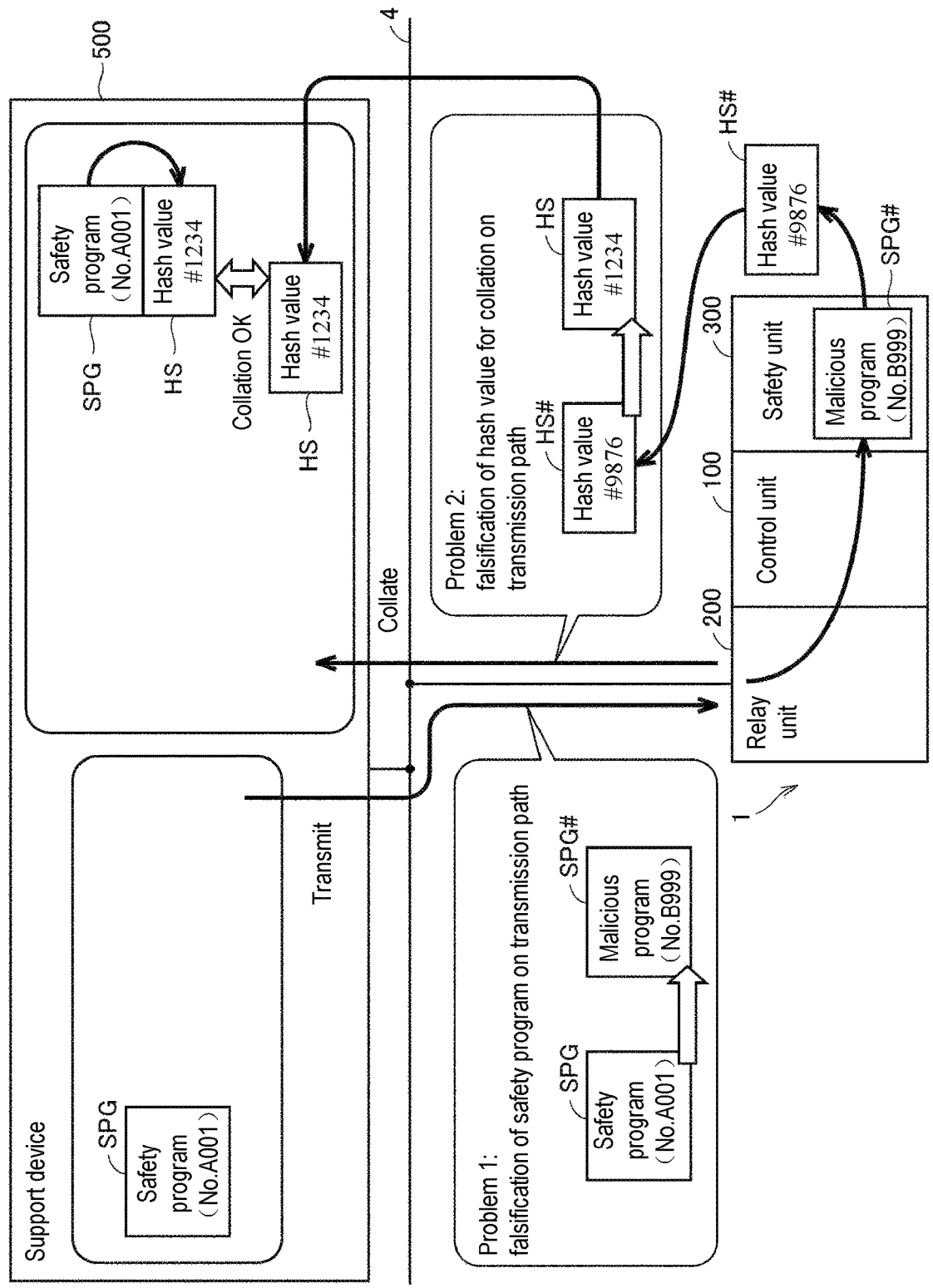
FIG. 18 is a diagram for describing another problem in remote maintenance by the support device on the safety system.

FIG. 18 is a diagram for describing another problem in remote maintenance by the support device 500 on the safety system 1. With reference to FIG. 18, a case where the safety program SPG is transmitted from the support device 500 to the safety system 1 (safety unit 300) is supposed. When various security threats are taken into consideration, falsification of the safety program SPG on a transmission path is supposed (problem 1). The example illustrated in FIG. 18 is an example in which the safety program SPG is falsified into a malicious program SPG #on the transmission path. The malicious program SPG #may be transmitted to the safety unit 300 due to the falsification.

Even in this case, an identity between the program transmitted to the safety unit 300 and the safety program SPG stored in the support device 500 are collated with each other. Specifically, a hash value calculated from the safety program SPG transmitted to the safety unit 300 is sent back to the support device 500, and the identity of the hash value is determined in the support device 500.

The hash value used for the collation process may also be falsified on the transmission path. In other words, a hash value HS #calculated from the malicious program SPG # transmitted to the safety unit 300 does not match a hash value HS calculated from the safety program SPG However, in a case where the hash value HS # is falsified into the original hash value HS on a transmission path on which the hash value HS # is transmitted from the safety unit 300 to the support device 500, and matches the hash value HS calculated from the correct safety program SPG stored in the support device 500, wrong collation occurs.

As a result, a user may not be aware that the malicious program SPG # is being executed on the safety unit 300. In a case where a hash value calculated from the safety program is displayed on the indicator disposed on the front surface of the safety unit 300, an operator can collate match with the hash value HS calculated in the support device 500 by using the indicator. Thus, when the operator is at the site, the operator can visually check whether or not the correct safety program SPG has been transmitted to the safety unit 300.

(h2: Solution Form)

A form using encryption based on a key as a solution form to the problem illustrated in FIG. 18 will be described.

Figure 19:
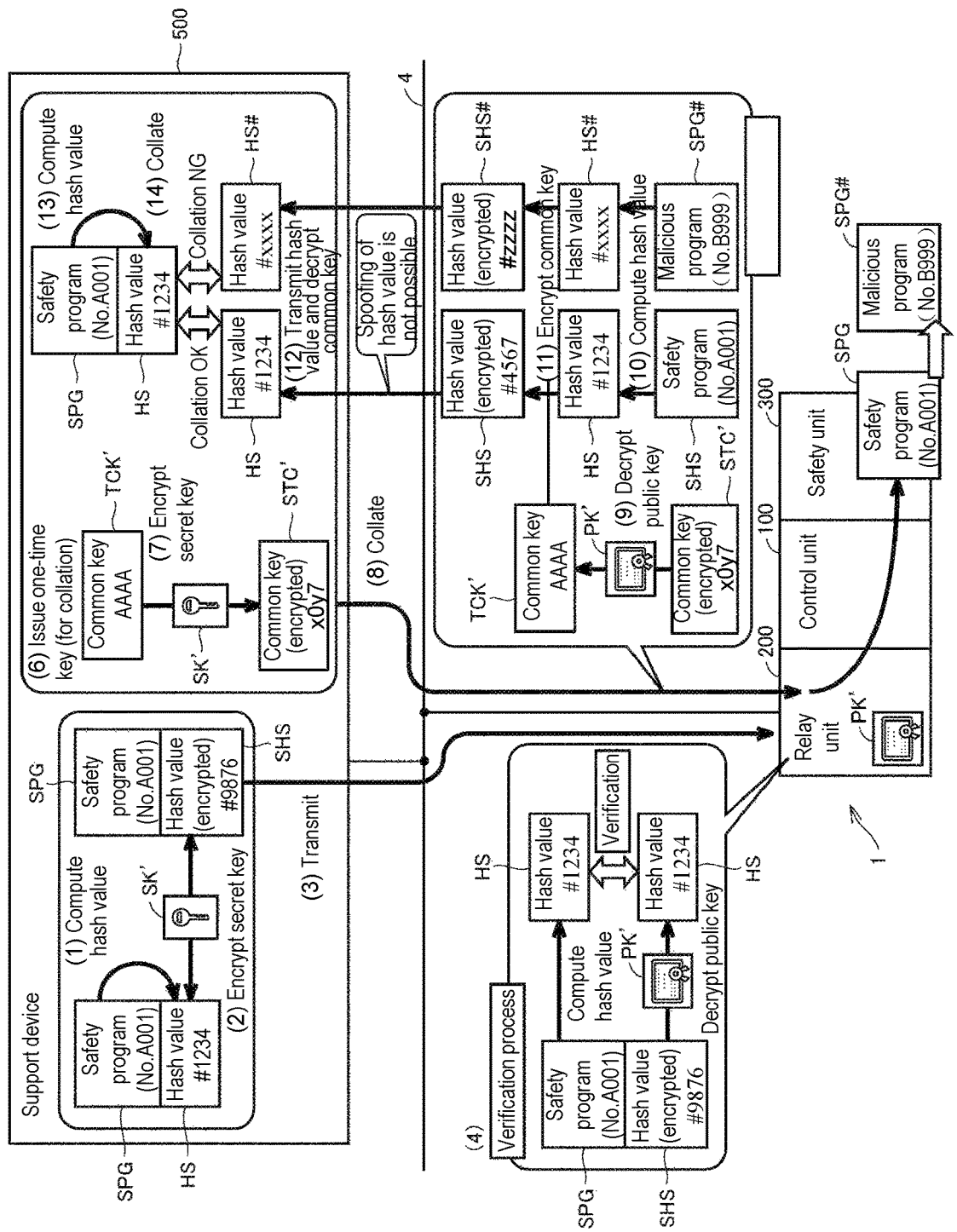
FIG. 19 is a diagram for describing still another form of remote maintenance by the support device on the safety system according to the present embodiment.

FIG. 19 is a diagram for describing still another form of remote maintenance by the support device 500 on the safety system 1 according to the present embodiment. In a configuration illustrated in FIG. 19, a key pair including a secret key SK' and a public key PK' is prepared in advance in the support device 500. The secret key SK' is stored in the support device 500, and the corresponding public key PK' is stored in the relay unit 200. In order to prevent the public key PK' from being spoofed, a server certificate generated by the certificate authority authenticating the public key PK' may be stored in the relay unit 200.

As described above, the support device 500 stores the secret key SK', and the relay unit 200 stores at least one of the public key PK' forming a pair with the secret key SK' and the electronic certificate (client certificate CR') issued for the public key PK'.

In the solution form illustrated in FIG. 19, encryption using a key is used for both of transmission of the safety program SPG from the support device 500 to the safety unit 300 and transmission (collation) of the hash value HS from the safety unit 300 to the support device 500. Hereinafter, a specific procedure example related to transmission of the safety program SPG in remote maintenance will be described. In other words, the support device 500 transmits the safety program SPG as data required for maintenance.

First, in a transmission process, the support device 500 calculates the hash value HS from the safety program SPG according to a predefined algorithm ((1) hash calculation). Next, the support device 500 encrypts the calculated hash value HS with the secret key SK' thereof to generate an encrypted hash value SHS ((2) secret key encryption). The support device 500 transmits the safety program SPG and the corresponding encrypted hash value SHS to the safety system 1 (relay unit 200) ((3) transmission).

Next, in a verification process, the relay unit 200 verifies whether or not the safety program SPG has been falsified on a transmission path ((4) verification process). More specifically, the relay unit 200 calculates the hash value HS from the safety program SPG included in the received transmission data. The relay unit 200 decrypts the encrypted hash value SHS included in the received transmission data into the hash value HS with the public key PK' of the support device 500. The support device 500 verifies an identity between the calculated hash value HS and the decrypted hash value HS.

As described above, in the verification process, the support device 500 encrypts the hash value HS calculated from the safety program SPG with the secret key SK' thereof and transmits the encrypted hash value to the relay unit 200. On the other hand, the relay unit 200 determines whether or not the hash value HS calculated from the safety program SPG received from the support device 500 matches a result obtained by decrypting the encrypted hash value SHS received from the support device 500 with the public key PK'.

Through such verification between the hash values, it is possible to guarantee that transmission data that has been transmitted to the safety system 1 (relay unit 200) from the support device 500 is not falsified. It is also possible to prevent spoofing of a sender of transmission data.

When the identity of the hash value HS is confirmed in the verification process, the safety program SPG is transmitted from the relay unit 200 to the safety unit 300 ((5) transmission).

Prior to collation in the support device 500, the support device 500 generates a common key TCK' as a one-time key ((6) one-time key generation (for collation)), and encrypts the generated common key TCK' with the secret key SK' thereof to generate an encrypted common key STC' ((7) secret key encryption). The support device 500 transmits the generated encrypted common key STC' to the relay unit 200.

The relay unit 200 decrypts the received encrypted common key STC' into the common key TCK' with the public key PK' of the support device 500 ((9) public key decryption).

The relay unit 200 calculates the hash value HS of the received safety program SPG ((10) hash value computation). The relay unit 200 encrypts the calculated hash value HS with the common key TCK' decrypted earlier to generate the encrypted hash value SHS ((11) common key encryption). When the relay unit 200 transmits the generated encrypted hash value SHS to the support device 500, the support device 500 decrypts the encrypted hash value SHS into the hash value HS with the common key TCK' ((12) hash value transmission and common key decryption).

The support device 500 calculates the hash value HS of the safety program SPG stored therein ((13) hash value computation). Finally, the support device 500 determines whether or not the hash value HS of the safety program SPG stored therein matches the hash value HS received from the relay unit 200 ((14) collation). When both of the hash values match each other, the collation is successful.

Here, as an example, a case where the safety program SPG transmitted to the safety unit 300 is falsified into the malicious program SPG #. In this case, the relay unit 200 calculates the hash value HS # from the malicious program SPG #. The hash value HS # is encrypted into the encrypted hash value SHS # with the common key TCK' to be transmitted to the support device 500. As described above, since the data encrypted with the common key TCK' is transmitted, the encrypted hash value SHS # cannot be falsified on a transmission path from the safety unit 300 to the support device 500. This is because, when any falsification is performed on the transmission path, decryption cannot be performed in the support device 500.

As described above, in the collation process, the relay unit 200 encrypts the hash value HS calculated from the safety program SPG received from the support device 500, and transmits the encrypted hash value to the support device 500. The support device 500 determines whether or not a result obtained by decrypting the encrypted hash value SHS received from the relay unit 200 matches the hash value HS calculated from the safety program SPG In the process ((3) transmission) of transmitting the safety program SPG and the corresponding encrypted hash value SHS from the support device 500 to the relay unit 200, the common key TCK described with reference to FIG. 12 may be used. It is possible to increase an encryption intensity by using the common key TCK.

Figure 20:
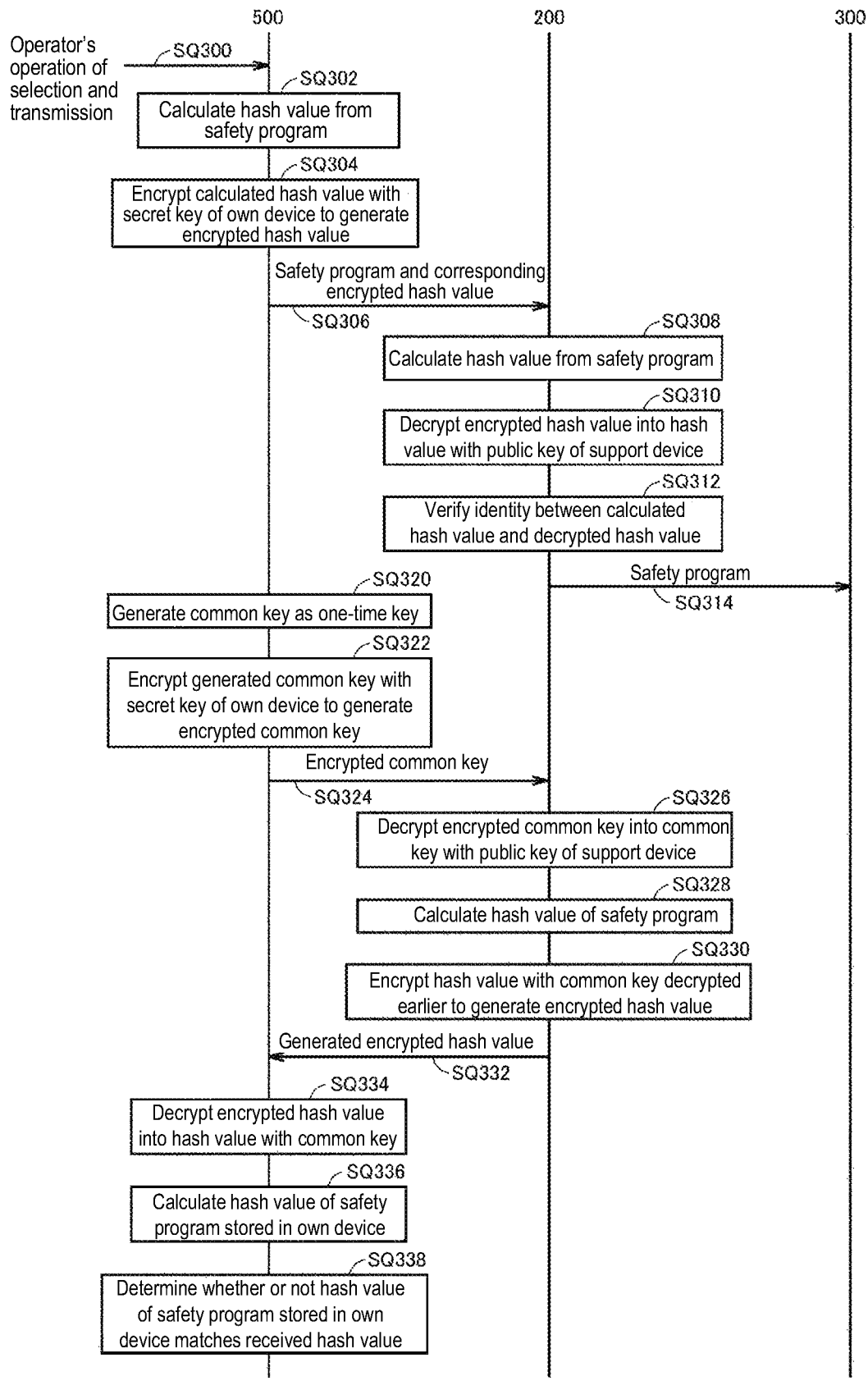
FIG. 20 is a sequence diagram illustrating process procedures in the remote maintenance illustrated in FIG. 19.

FIG. 20 is a sequence diagram illustrating process procedures in the remote maintenance illustrated in FIG. 19. With reference to FIG. 20, when an operation of selection of a transmission destination and transmission is received from the operator (sequence SQ300), the support device 500 calculates the hash value HS from the safety program SPG according to a predefined algorithm (sequence SQ302). Next, the support device 500 encrypts the calculated hash value HS with the secret key SK' thereof to generate an encrypted hash value SHS (sequence SQ304). The support device 500 transmits the safety program SPG and the corresponding encrypted hash value SHS to the relay unit 200 (sequence SQ306).

The relay unit 200 calculates the hash value HS from the safety program SPG included in the received transmission data (sequence SQ308). The relay unit 200 decrypts the encrypted hash value SHS included in the received transmission data into the hash value HS with the public key PK' of the support device 500 (sequence SQ310). The support device 500 verifies an identity between the calculated hash value HS and the decrypted hash value HS (sequence SQ312). When the identity between the hash values HS is confirmed, the relay unit 200 transmits the safety program SPG to the safety unit 300 (sequence SQ314).

The support device 500 generates the common key TCK' as a one-time key (sequence SQ320). Next, the support device 500 encrypts the generated common key TCK' with the secret key SK' thereof to generate an encrypted common key STC' (sequence SQ322). The support device 500 transmits the generated encrypted common key STC' to the relay unit 200 (sequence SQ324).

The relay unit 200 decrypts the received encrypted common key STC' into the common key TCK' with the public key PK' of the support device 500 (sequence SQ326). The relay unit 200 calculates the hash value HS of the received safety program SPG (sequence SQ328). The relay unit 200 encrypts the calculated hash value HS with the common key TCK' decrypted earlier to generate the encrypted hash value SHS (sequence SQ330). Next, the relay unit 200 transmits the generated encrypted hash value SHS to the support device 500 (sequence SQ332).

The support device 500 decrypts the encrypted hash value SHS into the hash value HS with the common key TCK' (sequence SQ334). The support device 500 calculates the hash value HS of the safety program SPG stored therein (sequence SQ336). Finally, the support device 500 determines whether or not the hash value HS of the safety program SPG stored therein matches the hash value HS received from the relay unit 200 (sequence SQ338).

As described above, it is possible to guarantee the identity of a rewritten file (requirement 4) and also to guarantee the authority of an operator performing maintenance (requirement 1) by using a key pair (the secret key SK' and the public key PK') associated with the support device 500.

<I. Time-Limited Public Key>

Generally, an intensity of a key may change depending on a use period thereof. As the expiration date of a key becomes longer, an intensity of the key may be reduced, and thus a security risk (such as the key being intercepted or being interpreted) may be increased. Therefore, a time-limited key is used, and thus the security risk can be reduced.

Figure 21:
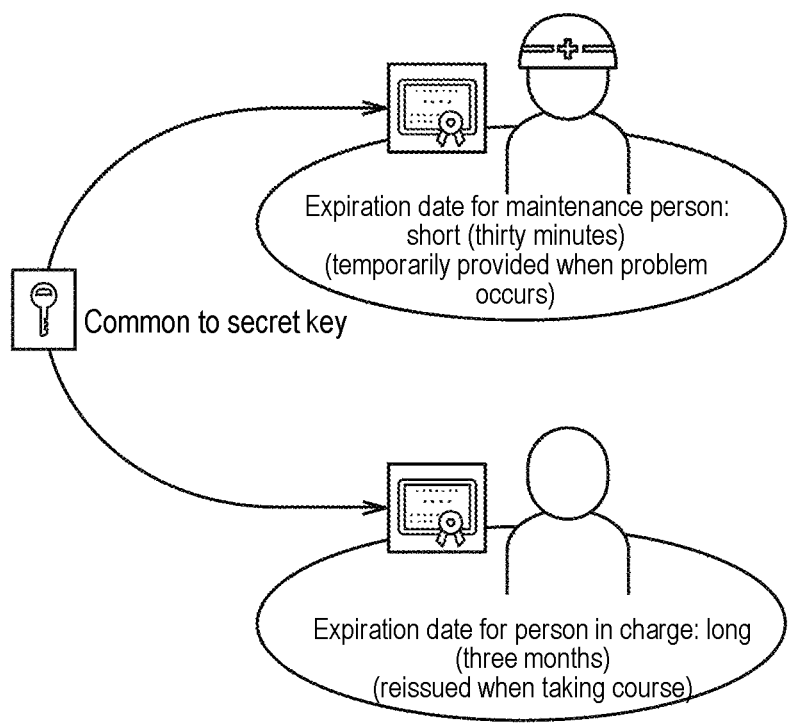
FIG. 21 is a diagram illustrating an example of setting the expiration date of a public key in the safety system according to the present embodiment.

FIG. 21 is a diagram illustrating an example of setting the expiration date of a public key in the safety system 1 according to the present embodiment. As illustrated in FIG. 21, for example, in the safety system 1, a maintenance person in charge of various types of maintenance work and a person in charge of supervising safety are supposed.

A short expiration date that is temporarily granted each time a problem occurs is set for the maintenance person such that remote maintenance can be performed in the event of any problem. On the other hand, the person in charge is required to sequentially manage the safety system 1, and thus a long expiration date is set for the person in charge. However, a secret key is preferably made common since the secret key does not increase the security risk.

Figure 22:
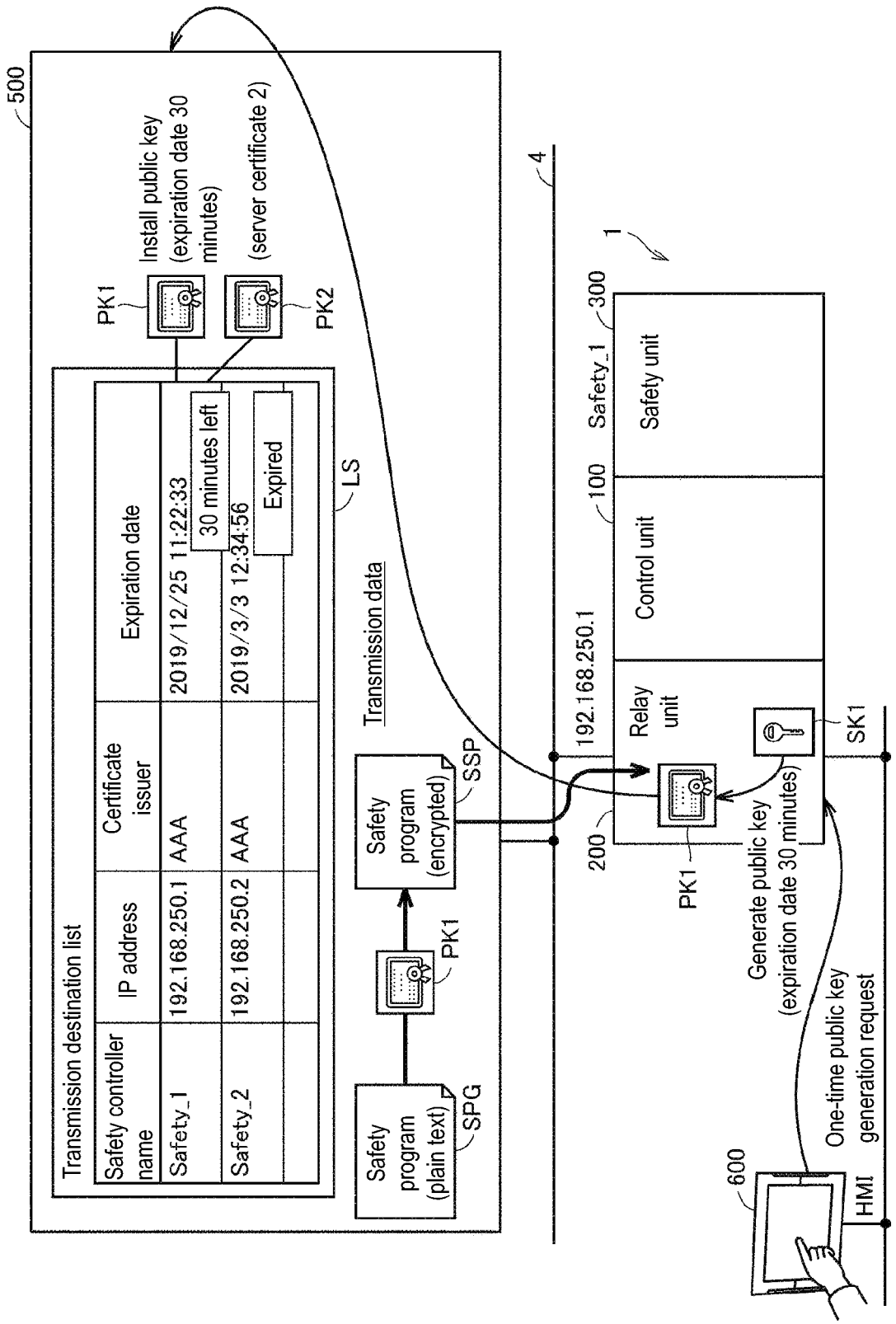
FIG. 22 is a diagram for describing still another form of remote maintenance by the support device on the safety system according to the present embodiment.

FIG. 22 is a diagram for describing still another form of remote maintenance by the support device 500 on the safety system 1 according to the present embodiment. With reference to FIG. 22, a configuration may be employed in which the public key PK1 valid for a limited period of time is temporarily issued to the support device 500 for remote maintenance.

The safety system 1 illustrated in FIG. 22 is connected to a display operation device 600 that receives an operation from an operator at a site. The operator at the site checks a target facility and safety of a worker and then operates the display operation device 600 to perform an operation for enabling temporary remote maintenance. Through the operation, the safety program SPG can be transmitted to the safety unit 300 from the support device 500, for example, for only thirty minutes.

More specifically, the display operation device 600 outputs a one-time public key generation request to the safety system 1 (relay unit 200) in response to the operation. The relay unit 200 generates the public key PK1 on the basis of the secret key SK1 in response to the one-time public key generation request, and installs the generated public key PK1 in the support device 500.

In the support device 500, it is possible to perform remote maintenance (typically, transmission of the safety program SPG or the like) on the safety system 1 by using the public key PK1. In this case, a relatively short expiration date (for example, thirty minutes) is set for the public key PK1. As described above, the relay unit 200 of the safety system 1 defines an expiration date for the public key PK1 in advance in response to a request from the outside, and then provides the public key PK1 to the support device 500.

As described above, it is possible to realize the requirement 3 "a rewrite target device can be uniquely identified" by using the secret key SK1 and the public key PK1. Since the configuration in which remote maintenance can be performed by the operator at the site operating the display operation device 600 is employed, it is possible to more reliably realize the requirement 5 "a worker at a site is safe".

Figure 23:
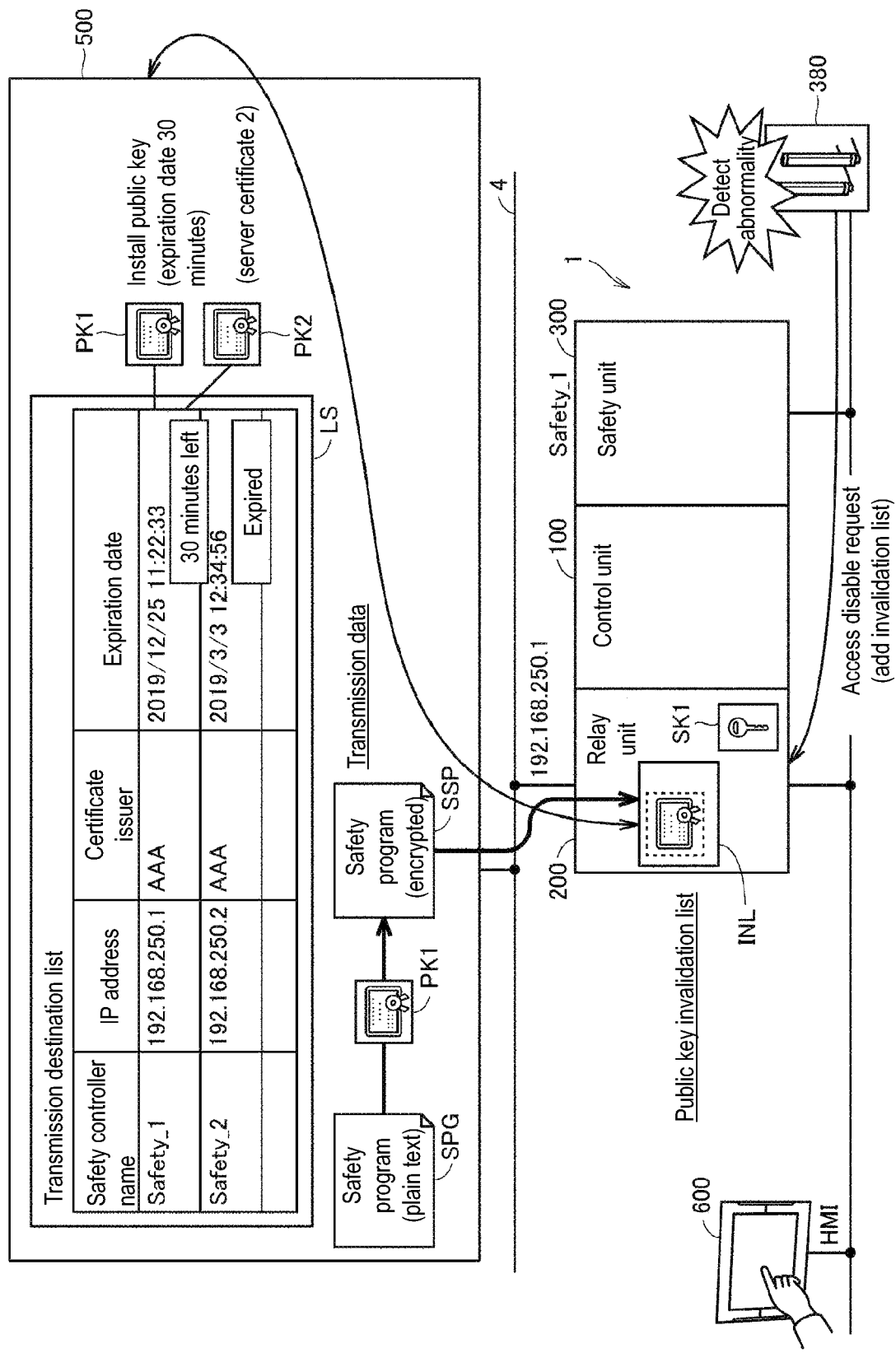
FIG. 23 is a diagram for describing a separate form of remote maintenance by the support device illustrated in FIG. 22.

FIG. 23 is a diagram for describing a separate form of remote maintenance by the support device 500 illustrated in FIG. 22. As illustrated in FIG. 23, a signal from a safety device 380 such as a light curtain is input to the safety unit 300. In this configuration, when the light curtain detects any intruder and the safety unit 300 executes a certain safety action, remote maintenance by the support device 500 may be prohibited.

In other words, this is because, in a period in which the safety unit 300 executes a certain safety action, it is preferable to prohibit such rewriting or the like of the safety program SPG that stops execution of the safety action.

Specifically, when the safety unit 300 receives a signal from the safety device 380 and starts a certain safety action, an access disable request may be transmitted to the relay unit 200.

As a method of disabling access, a public key invalidation list INL may be used. When any public key is registered in the public key invalidation list INL, the registered public key is invalidated even within an expiration date. In other words, the support device 500 cannot perform remote maintenance using a public key registered in the public key invalidation list INL.

The public key invalidation list INL may be stored in the relay unit 200, or may be stored in a certificate authority or the like other than the safety system 1.

It is possible to restrict an authority to be able to perform remote maintenance on the safety system 1 and thus to increase a security intensity by using the public key invalidation list INL.

Figure 24:
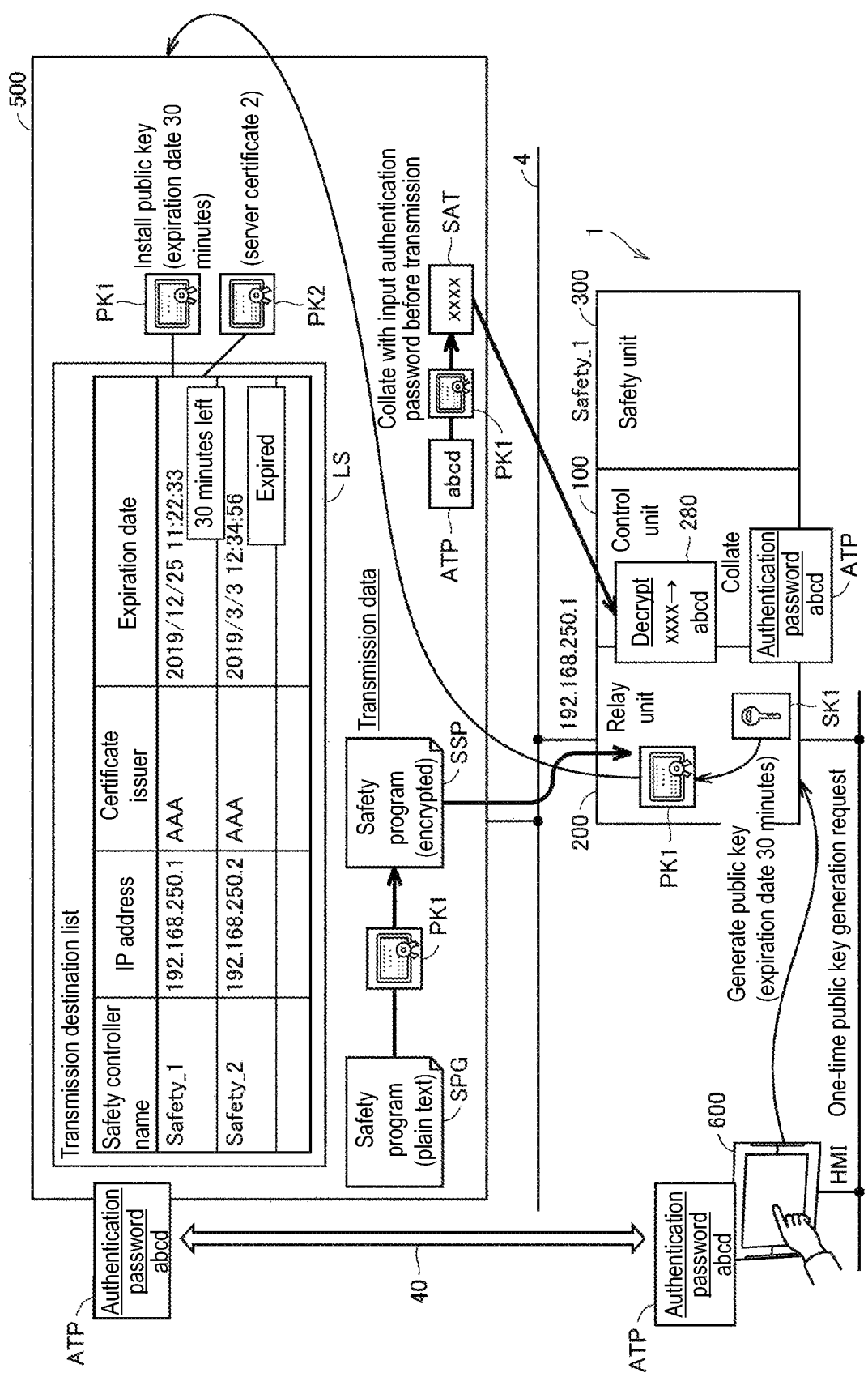
FIG. 24 is a diagram for describing another separate form of remote maintenance by the support device illustrated in FIG. 22.

FIG. 24 is a diagram for describing another separate form of remote maintenance by the support device 500 illustrated in FIG. 22. As illustrated in FIG. 24, for example, an operator who operates the support device 500 to perform remote maintenance and an operator at a site share a password by secure communication means such as a telephone, and respectively input an authentication password ATP to the support device 500 and the display operation device 600.

In the support device 500, the input authentication password ATP is encrypted with the public key PK1, and thus an encrypted authentication password SAT is generated. The encrypted authentication password SAT is transmitted to the safety system 1 as transmission data along with the encrypted safety program SSP.

On the other hand, the display operation device 600 transmits the input authentication password ATP to the safety system 1 (relay unit 200). The relay unit 200 decrypts the encrypted authentication password SAT included in the transmission data from the support device 500, and collates whether or not the decrypted result matches the authentication password ATP received from the display operation device 600. Only in a case where the collation with the authentication password ATP is successful, remote maintenance by the support device 500 is enabled.

As described above, the operator who operates the support device 500 to perform remote maintenance and the operator at the site communicate with each other, and thus it is possible to more reliably realize the requirement 5 "a worker at a site is safe". It is possible to further increase a security intensity by using the authentication password ATP shared by the operators. In other words, even if the public key PK provided from the relay unit 200 to the support device 500 is intercepted, it is possible to inhibit illegal remote maintenance by using the authentication password ATP.

<J. Other Forms>

In the above embodiment, the system in which the safety unit 300 executing the safety program SPG and the relay unit 200 exchanging data with the support device 500 are provided separately has been exemplified. In a case where the relay unit 200 and the safety unit 300 are provided separately from each other, the relay unit 200 is added to an existing system, and thus it is possible to easily realize the above-described remote maintenance.

However, the relay unit 200 and the safety unit 300 are not necessarily provided separately from each other, and a configuration in which both of the units are integrated may be employed. A configuration in which the control unit 100, the relay unit 200, and the safety unit 300 are integrated may be employed. In this case, there is an advantage that a casing can be made compact.

Figure 25:
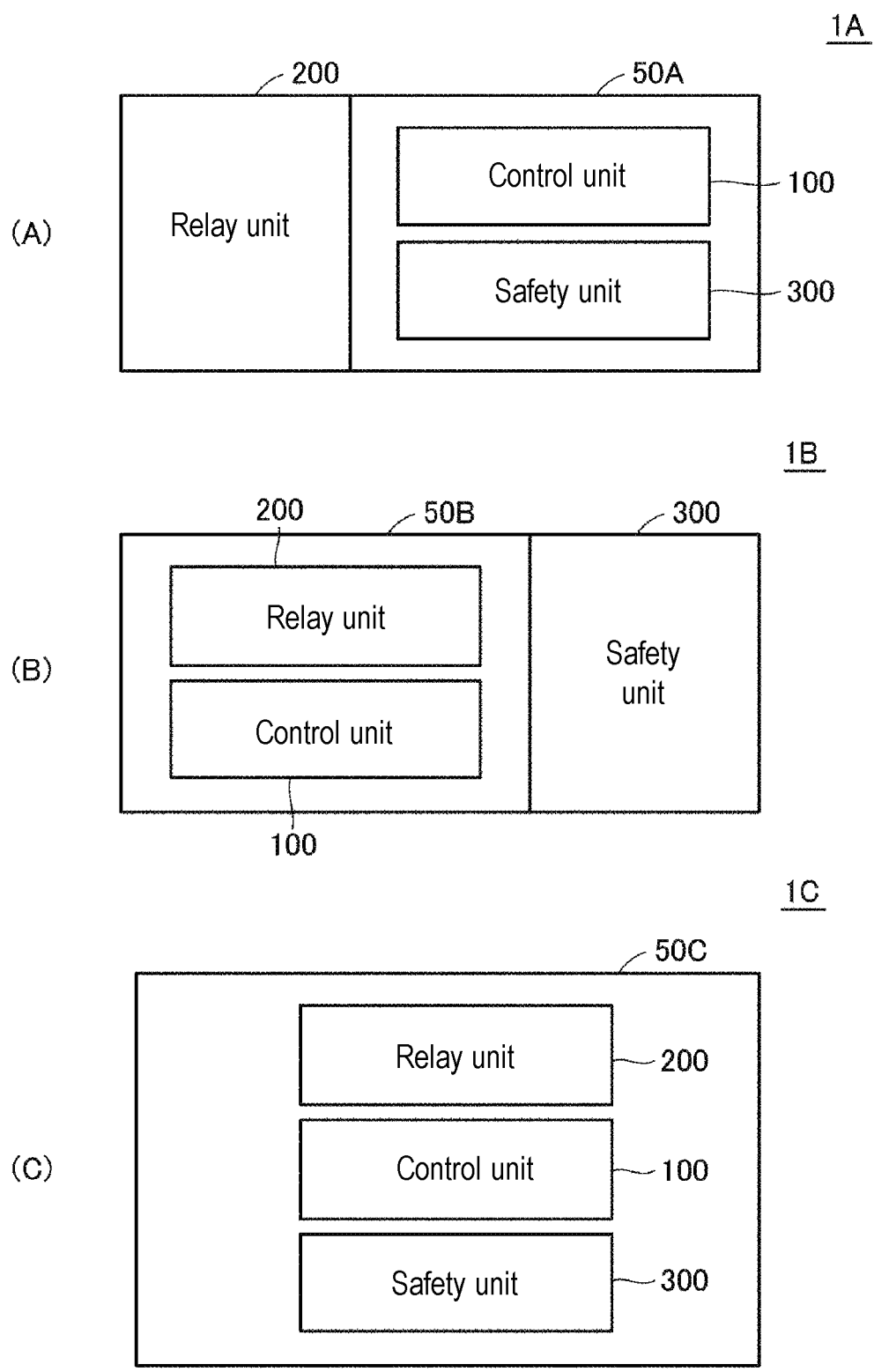
FIG. 25 is a schematic diagram illustrating a modification example of a configuration of the safety system according to the present embodiment.

FIG. 25 is a schematic diagram illustrating a modification example of a configuration of the safety system 1 according to the present embodiment. FIG. 25 illustrates a configuration example in which some or all of the control unit 100, the relay unit 200, and the safety unit 300 are integrated.

A safety system 1A illustrated in (A) of FIG. 25 includes an integrated unit 50A in which the control unit 100 and the safety unit 300 are integrated, and the relay unit 200. In other words, in the integrated unit 50A of the safety system 1A, standard control and safety control are executed in the same unit.

A safety system 1B illustrated in (B) of FIG. 25 includes an integrated unit 50B in which the control unit 100 and the relay unit 200 are integrated, and the safety unit 300. In other words, in the integrated unit 50B of the safety system 1B, a communication process with other devices and standard control are executed in the same unit.

A safety system 1C illustrated in (C) of FIG. 25 includes an integrated unit 50C in which the control unit 100, the relay unit 200, and the safety unit 300 are integrated. In other words, in the integrated unit 50C of the safety system 1C, a communication process with other devices, standard control, and safety control are executed in the same unit.

As described above, any installation form of the functions and the processes provided by the control unit 100, the relay unit 200, and the safety unit 300 may be used. Some of the functions provided by the control unit 100, the relay unit 200, and the safety unit 300 may be installed in a common processing unit.

<K. Appendix>

The present embodiment described above includes the following technical concept.

[Configuration 1]

A safety system including:
a process execution unit (300) that executes safety control according to a safety program (SPG);
a communication unit (200) that is directly connected to the process execution unit and mediates external access to the safety program stored in the process execution unit; and
a support device (500) that is connected to the communication unit via a network and executes maintenance including an addition or a change with respect to the safety program in accordance with a user operation,
in which the support device and the communication unit identify each other by using information (SK, PK, CR) exchanged in advance, and exchange data required for the maintenance.

[Configuration 2]

The safety system according to Configuration 1,
in which the communication unit stores a key (SK) as at least part of the information exchanged in advance, and
in which the support device encrypts the data required for the maintenance such that the data is decryptable with the key by the communication unit, and transmits the data to the communication unit.

[Configuration 3]

The safety system according to Configuration 2,
in which the communication unit stores a first secret key (SK) as the key, and
in which the support device stores at least one of a first public key (PK) forming a pair with the first secret key and a first electronic certificate (CR) issued for the first public key.

[Configuration 4]

The safety system according to Configuration 3,
in which, in a case where the data transmitted from the support device is decryptable with the first secret key (SK), the communication unit transmits the decrypted data to the process execution unit.

[Configuration 5]

The safety system according to Configuration 3,
in which the communication unit defines an expiration date for the first public key (PK) in advance in response to a request from outside, and then provides the first public key (PK) to the support device.

[Configuration 6]

The safety system according to Configuration 3,
in which the support device stores the first electronic certificate (CR) issued for the first public key (PK) forming a pair with the first secret key (SK), and the first electronic certificate includes identification information (SRN) for identifying the process execution unit, and
in which the support device determines whether or not identification information (SRN) of the process execution unit acquired via the communication unit matches the identification information (SRN) included in the first electronic certificate before the data required for the maintenance is transmitted.

[Configuration 7]

The safety system according to Configuration 6,
in which the support device transmits the data required for the maintenance to the communication unit on condition that the identification information (SRN) of the process execution unit acquired via the communication unit matches the identification information (SRN) included in the first electronic certificate (CR).

[Configuration 8]

The safety system according to Configuration 3,
in which the support device
generates a third key (TCK) that is a one-time key in a case where the data required for the maintenance is required to be transmitted, and
encrypts the data required for the maintenance with the third key (TCK), encrypts the third key to be decryptable with the key by the communication unit, and transmits the data and the third key to the communication unit.

[Configuration 9]

The safety system according to Configuration 1,
in which the support device is configured to transmit the safety program (SPG) as the data required for the maintenance,
in which the support device stores a second secret key (SK'),
in which the communication unit stores at least one of a second public key (PK') forming a pair with the second secret key and a second electronic certificate (CR') issued for the second public key,
in which the support device encrypts a first hash value (HS) calculated from the safety program with the second secret key, and transmits the encrypted first hash value to the communication unit, and
in which the communication unit determines whether or not a second hash value (HS) calculated from the safety program that has been received from the support device matches a result obtained by decrypting the encrypted first hash value received from the support device with the second public key.

[Configuration 10]

The safety system according to Configuration 9,
in which the communication unit encrypts the second hash value (HS) calculated from the safety program that has been received from the support device, and transmits the second hash value to the support device, and
in which the support device determines whether or not a result obtained by decrypting the encrypted second hash value (HS) received from the communication unit matches the first hash value calculated from the safety program.

[Configuration 11]

The safety system according to Configuration 1, in which the process execution unit and the communication unit are provided separately from each other.

[Configuration 12]

A maintenance method in a controller system including a process execution unit (300) that executes safety control according to a safety program (SPG), the maintenance method including:

a step (SQ106) of connecting a support device to a communication unit via a network;

a step (SQ104, SQ114) of causing the support device to execute maintenance including an addition or a change with respect to the safety program in accordance with a user operation; and a step (SQ106 to SQ110) of causing the support device and the communication unit to identify each other by using information exchanged in advance, and to exchange data required for the maintenance.

<L. Advantages>

According to the safety system 1 of the present embodiment, the support device 500 and the relay unit 200 identify each other by using information (for example, a secret key or a public key) exchanged in advance therebetween. Consequently, the relay unit 200 that is a connection destination can be uniquely identified from the support device 500. Conversely, the relay unit 200 can uniquely identify the support device 500 that is a transmission source. Thus, it is possible to realize remote maintenance while satisfying the requirements defined in IEC 62061.

As a result, it is possible to increase efficiency of remote maintenance and thus to improve productivity of a production facility.

It should be considered that the embodiments disclosed this time are exemplary in all respects and not limited. The scope of the present invention is shown by the claims, not the above description, and is intended to include all modifications within the meaning and the scope equivalent to the claims.

The invention claimed is:

1. A safety system comprising:

a process execution unit, comprising a first processor, wherein the first processor executes safety control according to a safety program;

a communication unit, directly connected to the process execution unit and comprising a second processor, wherein the second processor mediates external access to the safety program stored in the process execution unit; and a support unit, connected to the communication unit via a network and comprising a third processor, wherein the third processor executes maintenance including an addition or a change with respect to the safety program in accordance with a user operation, wherein the third processor and the second processor identify each other by using information exchanged in advance, and exchange data required for the maintenance, the second processor stores a key as at least part of the information exchanged in advance, the second processor stores a first secret key as the key, the third processor stores at least one of a first public key forming a pair with the first secret key and a first electronic certificate issued by a certificate authority for the first public key for preventing the first public key from being spoofed, the third processor generates a third key and encrypts the safety program with the third key, encrypts the third key to be decryptable with the key by the second processor, and transmits the encrypted safety program as the data required for the maintenance and the third key to the second processor, the second processor encrypts a second hash value calculated from the safety program that has been received from the third processor with the third key obtained from the third processor and decrypted with the key, and the third processor decrypts and collates the encrypted second hash value received from the second processor, the third processor stores a second secret key, the second processor stores at least one of a second public key forming a pair with the second secret key and a second electronic certificate issued for the second public key, the third processor encrypts a first hash value calculated from the safety program with the second secret key, and transmits the encrypted first hash value to the second processor, and the second processor determines whether or not the second hash value calculated from the safety program that has been received from the third processor matches a result obtained by verifying the encrypted first hash value received from the third processor with the second public key.

2. The safety system according to claim 1, wherein the third processor stores a first electronic certificate issued for the first public key.

3. The safety system according to claim 2, wherein, in a case where the data transmitted from the third processor is decryptable with the third key, the second processor transmits the decrypted data to the first processor.

4. The safety system according to claim 2, wherein the second processor defines an expiration date for the first public key in advance in response to a request from outside, and then provides the first public key to the third processor.

5. The safety system according to claim 2, wherein the third processor stores the first electronic certificate issued for the first public key forming a pair with the first secret key, and the first electronic certificate includes identification information for identifying the first processor, and wherein the third processor determines whether or not identification information of the first processor acquired via the second processor matches the identification information included in the first electronic certificate before the data required for the maintenance is transmitted.

6. The safety system according to claim 5, wherein the third processor transmits the data required for the maintenance to the second processor on condition that the identification information of the first processor acquired via the second processor matches the identification information included in the first electronic certificate.

7. The safety system according to claim 1, wherein the first processor and the second processor are provided separately from each other.

8. A maintenance method in a controller system including a first processor that executes safety control according to a safety program, the maintenance method comprising:

connecting a third processor to a second processor via a network;

executing, through the third processor, maintenance including an addition or a change with respect to the safety program in accordance with a user operation; and identifying each other, for the third processor and the second processor, by using information exchanged in advance, and exchanging, between the third processor and the second processor, data required for the maintenance, wherein the maintenance method further comprises:

storing, through the second processor, a key as at least part of the information exchanged in advance, storing, through the second processor a first secret key as the key, storing, through the third processor, at least one of a first public key forming a pair with the first secret key and a first electronic certificate issued by a certificate authority for the first public key for preventing the first public key from being spoofed, generating, through the third processor, generates a third key, encrypting, through the third processor, the safety program with the third key, encrypts the third key to be decryptable with the key by the second processor, and transmitting, through the third processor, the encrypted safety program as the data required for the maintenance and the third key to the second processor, encrypting, through the second processor, a second hash value calculated from the safety program that has been received from the third processor with the third key obtained from the third processor that is decrypted with the key, decrypting and collating, through the third processor, the encrypted second hash value received from the second processor, storing, through the third processor, a second secret key, storing, through the second processor, at least one of a second public key forming a pair with the second secret key and a second electronic certificate issued for the second public key, encrypting, through the third processor, a first hash value calculated from the safety program with the second secret key, and transmitting, through the third processor, the encrypted first hash value to the second processor, and determining, through the second processor, whether or not the second hash value calculated from the safety program that has been received from the third processor matches a result obtained by verifying the encrypted first hash value received from the third processor with the second public key.

* * * * *